United States Patent
Rakib et al.

(10) Patent No.: US 7,548,558 B2
(45) Date of Patent: Jun. 16, 2009

(54) CABLE MODEM TERMINATION SYSTEM WITH FLEXIBLE ADDITION OF SINGLE UPSTREAMS OR DOWNSTREAMS

(75) Inventors: Selim Shlomo Rakib, Cupertino, CA (US); Yehuda Azenko, Cupertino, CA (US)

(73) Assignee: Terayon Communications Systems, Inc., Santa Clara, CA (US)

( * ) Notice: Subject to any disclaimer, the term of this patent is extended or adjusted under 35 U.S.C. 154(b) by 1258 days.

(21) Appl. No.: 10/725,092

(22) Filed: Dec. 1, 2003

(65) Prior Publication Data

US 2005/0025145 A1 Feb. 3, 2005

Related U.S. Application Data

(63) Continuation-in-part of application No. 10/295,712, filed on Nov. 15, 2002, now Pat. No. 7,298,762.

(51) Int. Cl.
*H04J 3/16* (2006.01)
(52) U.S. Cl. .................... 370/466; 370/235
(58) Field of Classification Search ............ 370/465, 370/466, 468, 230, 235, 503, 469, 252, 432
See application file for complete search history.

(56) References Cited

U.S. PATENT DOCUMENTS

| | | | |
|---|---|---|---|
| 5,648,958 A | 7/1997 | Counterman | |
| 5,963,557 A | 10/1999 | Eng | |
| 6,490,727 B1 | 12/2002 | Nazarathy et al. | |
| 6,650,624 B1 | 11/2003 | Quigley et al. | |
| 6,785,564 B1 * | 8/2004 | Quigley et al. | 455/574 |
| 6,917,614 B1 | 7/2005 | Laubach et al. | |
| 6,993,016 B1 * | 1/2006 | Liva et al. | 370/356 |
| 7,085,287 B1 | 8/2006 | Chapman | |
| 7,113,484 B1 * | 9/2006 | Chapman et al. | 370/252 |
| 7,162,731 B2 * | 1/2007 | Reidhead et al. | 725/107 |
| 7,164,697 B1 * | 1/2007 | Beser | 370/485 |
| 7,246,368 B1 * | 7/2007 | Millet et al. | 725/111 |
| 2002/0075805 A1 * | 6/2002 | Gupta et al. | 370/235 |
| 2002/0093966 A1 * | 7/2002 | Liva et al. | 370/400 |
| 2002/0126685 A1 * | 9/2002 | Leatherbury et al. | 370/432 |
| 2002/0136203 A1 * | 9/2002 | Liva et al. | 370/352 |
| 2003/0031198 A1 * | 2/2003 | Currivan et al. | 370/465 |
| 2003/0053493 A1 * | 3/2003 | Mobley et al. | 370/538 |
| 2003/0058885 A1 * | 3/2003 | Sorenson et al. | 370/468 |
| 2003/0120819 A1 * | 6/2003 | Abramson et al. | 709/250 |
| 2006/0171390 A1 * | 8/2006 | La Joie | 370/390 |

\* cited by examiner

*Primary Examiner*—Chi H. Pham
*Assistant Examiner*—Kevin Mew
(74) *Attorney, Agent, or Firm*—Larry T. Cullen

(57) ABSTRACT

A cable modem termination system is disclosed with flexible mapping of upstreams to downstreams and flexible mapping of downstreams to optical nodes and optical nodes to upstream receivers and the ability to add singe upstreams or downstreams as needed for load balancing. Multiple downstreams can share the same upstream. Multiple receivers can be coupled to the same upstream. Monitoring of upstream performance for overperforming or underperforming modems can be carried out, and new upstreams with higher and/or lower throughtput can be created to service the overperformers and/or underperformers. Modems can be grouped into logical groups with different performance levels and serviced by different upstreams or different upstream logical channels on the same upstream physical channel.

17 Claims, 17 Drawing Sheets

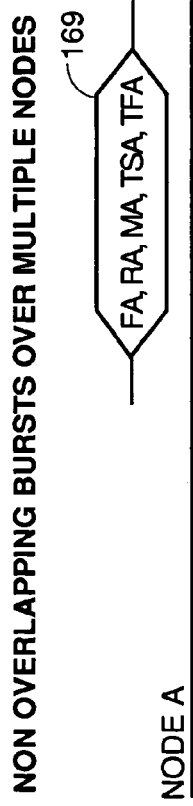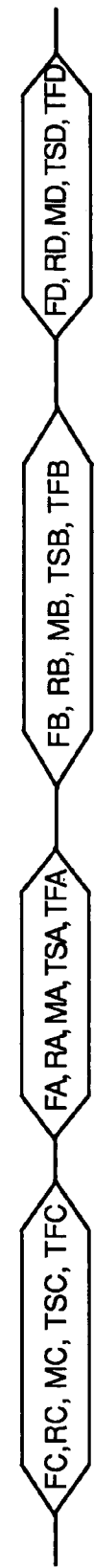
FIG. 7
FIG. 8

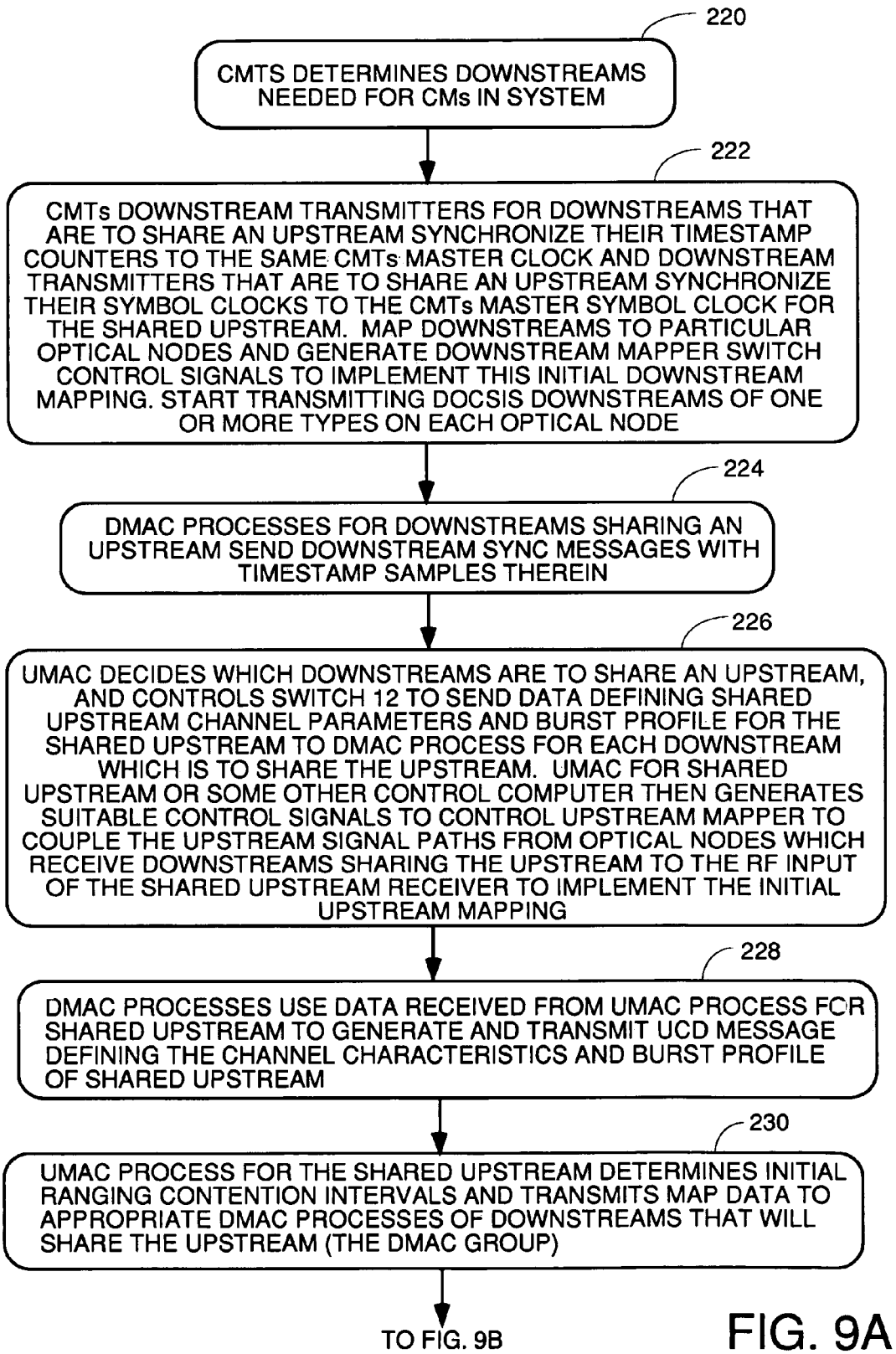

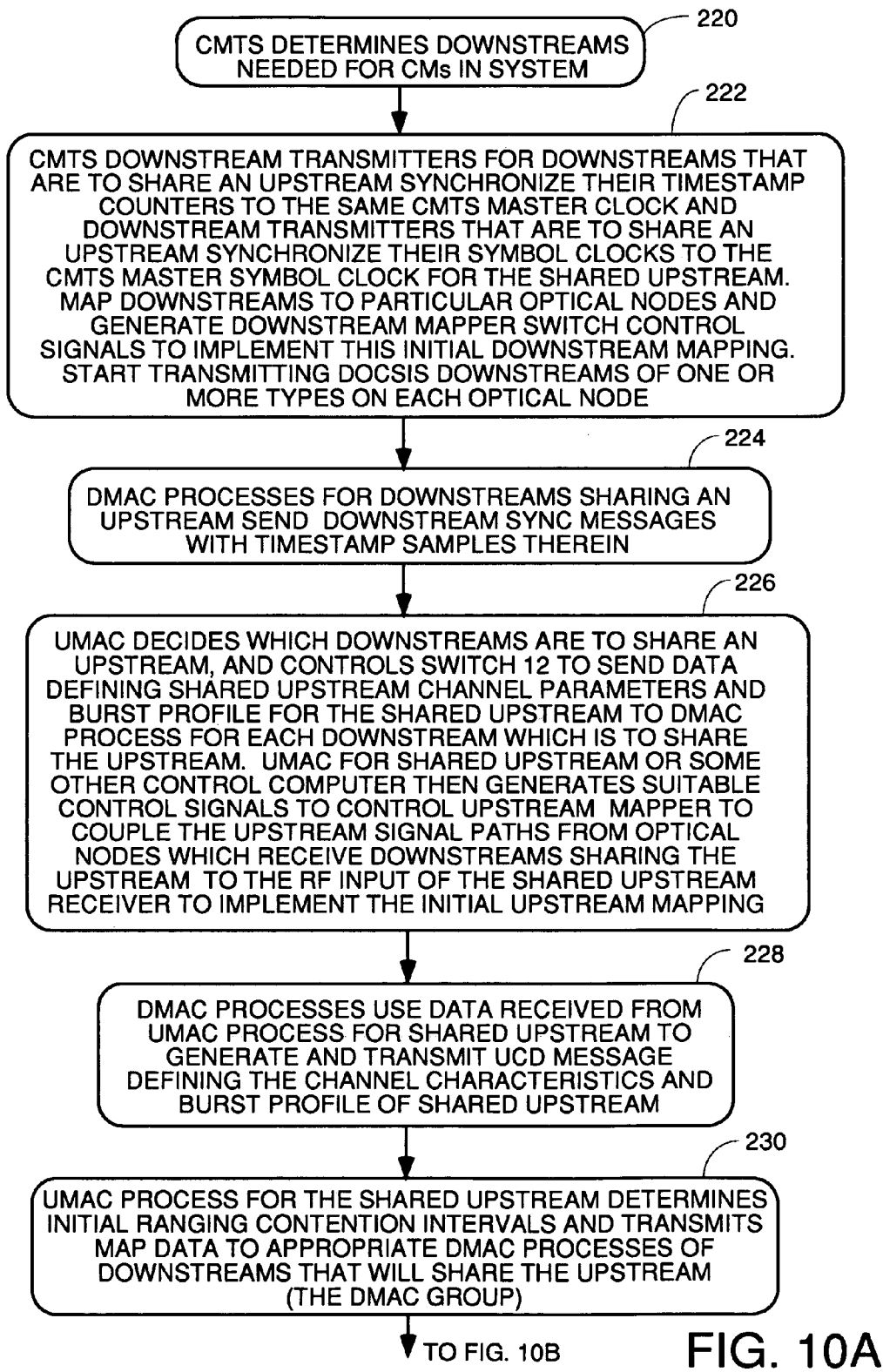

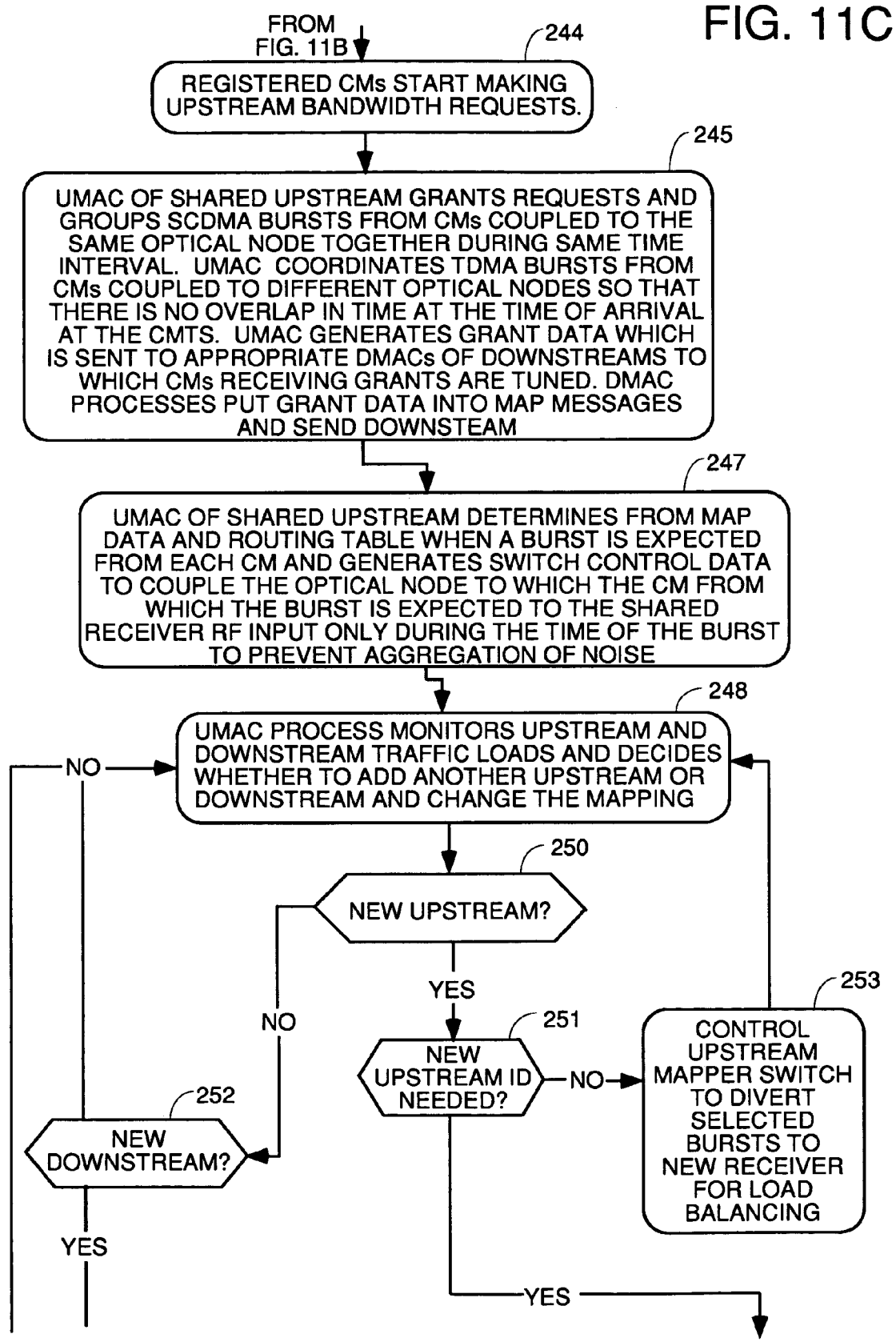

CABLE MODEM TERMINATION SYSTEM WITH FLEXIBLE ADDITION OF SINGLE UPSTREAMS OR DOWNSTREAMS

This is a continuation-in-part of a U.S. patent application entitled PROCESS FOR SHARING AN UPSTREAM AMONG MULTIPLE DOWNSTREAMS, Ser. No. 10/295,712, filed Nov. 15, 2002 now U.S. Pat. No. 7,298,762 which is hereby incorporated by reference.

BACKGROUND OF THE INVENTION

In today's cable modem termination systems (CMTS), there is a fixed ratio of downstreams to upstreams on each expansion card. This means that a prior art expansion card for a CMTS has one downstream transmitter with all the media access control and physical layer circuitry needed to transmit a DOCSIS downstream on a hybrid fiber coaxial cable (HFC). The prior art expansion cards also has four upstream receivers, each with the MAC and physical layer circuitry needed to interface with one hybrid fiber coaxial cable medium. Other prior art expansion cards have different ratios of upstreams to downstreams. However, the need for additional upstream and downstream capacity does not change in the same fixed ratio as the cards. Thus, when upstream or downstream installed capacity is exceeded, another card must be added which adds another downstream and four upstreams. This causes excessive expenditure and bad return on investment if all the cable operator needs is another upstream or another downstream. A need has arisen for a system which can smoothly and gradually add downstream or upstream capacity as needed. As downstreams are added, it would be convenient to be able to associate them to a shared upstream. A U.S. patent application entitled PROCESS FOR SHARING AN UPSTREAM AMONG MULTIPLE DOWNSTREAMS, Ser. No. 10/295,712, filed Nov. 15, 2002 teaches how to do this and teaches a CMTS mapping system at FIG. 11. This CMTS mapping system maps M downstreams flexibly to N HFC systems. In other words, it has the ability to split a single downstream for simultaneous transmission thereof on more than one HFC and to combine multiple downstreams for transmission on a single HFC (or multiple HFC systems that are different in number than the number of downstreams which have been combined). The CMTS mapping system also has the ability to allow multiple downstreams to share a single upstream receiver, and the ability to combine an upstream arriving on multiple HFC systems for coupling to an input of a single upstream receiver.

Further, it would be desirable to share a downstream between multiple upstreams and to do load balancing as traffic conditions dictate. This notion of flexible addition of upstreams and downstream, removing the necessity for a line card to have both upstreams and downstream or fixed ratios therebetween, and flexible mapping between upstreams and downstreams will be referred to as upstream/downstream decoupling. Decoupling is somewhat misdescriptive because the downstreams which share an upstream must be coordinated tightly as will be described below. The term is meant here to refer to the elimination of the need to add unneeded circuitry as the need for capacity grows by providing a greater granularity in the ability to add single downstream cards or single upstream cards, map multiple downstreams to the same upstream or multiple upstreams to the same downstream, and coordinate the media access control messaging needed to do that.

Further, it would be desirable to provide a CMTS which supports the coexistence of MPEG video delivery via conventional transport streams with video delivery over IP packets, and provide two way conditional access and high definition delivery capability and video rate shaping.

SUMMARY OF THE INVENTION

The preferred embodiment of a cable modem termination system has a flexible mapping subsystem comprised of:
  a downstream mapper having one or more inputs for coupling to DOCSIS downstream transmitters, and one or more outputs for coupling to hybrid fiber coaxial cable systems, and having a control input;
  an upstream mapper having one or more inputs for coupling to hybrid fiber coaxial cable systems and having one or more outputs for coupling to inputs of one or more DOCSIS upstream receivers, and having a control input (a circuit to carry out this function is disclosed in U.S. patent application entitled ANALOG FRONT END MULTIPLEXER FOR CMTS RECEIVER, Ser. No. 10/191,164, filed Jul. 8, 2002, which is hereby incorporated by reference);
  a control circuit coupled to said control inputs for generating signals which control which transmitters are coupled to which optical nodes and which optical nodes are coupled to which receivers.

This flexible mapping system flexibly couples the receivers and transmitters of a cable modem termination system (CMTS) to the optical nodes of an HFC system. The CMTS itself is comprised of:
  a storage/cache circuit;
  one or more downstream transmitter line cards, each having a DOCSIS downstream transmitter thereon which is coupled to said downstream mapper;
  one or more upstream receiver line cards, each having a DOCSIS upstream receiver thereon having a radio frequency input coupled to said upstream mapper;
  a forwarder/application server;
  a packet switch having one or more ports for coupling to a wide area network, one or more ports for coupling to one or more local content servers, one or more ports coupled to said storage/cache circuit, one or more ports coupled to said transmitter line cards, one or more ports coupled to said receiver line cards, one or more ports coupled to said forwarder/application server.

In the preferred embodiment, each receiver is a separate line card which has a computer therein programmed with an upstream media access control process (UMAC). The receiver circuitry is not critical to the invention, and any DOCSIS compatible receiver circuit will suffice. In the preferred embodiment, each transmitter is a separate line card having a computer therein programmed to execute a downstream media access control process (DMAC) for a DOCSIS downstream generated by said transmitter. The transmitter circuitry is also not critical to the invention, and any transmitter that can transmit a DOCSIS compatible downstream will suffice. However, the UMAC and DMAC processes do have to function and cooperate as described herein.

What is significant about this CMTS arrangement is the granularity and flexibility of it. What this means is that every shared upstream receiver can be on a different linecard than the downstream receiver linecards which share the upstream receiver linecard, and the packet switch can pass data and messages between the UMAC of the shared upstream and DMAC processes in each downstream in the group of downstreams which share the upstream. The upstream mappers provides the significant new ability to electronically map which optical nodes will be terminated in which upstream receivers at the CMTS and to change that mapping to add new receivers to the same upstream or add new upstreams as conditions dictate. The downstream mapper provides the significant new ability to electronically map downstream transmitters to optical nodes. The UMAC and DMAC processes are new and are written so as to cooperate with each other by exchanging data through the packet switch to allow multiple downstreams to share the same upstream and to assign more or fewer downstreams to each upstream as the need arises, and to add more upstreams or more receivers to an existing shared upstream as load balancing conditions dictate or as needed to resolve communication problems some cable modems may be having in transmitting upstream (by creating a lower throughput upstream with a lower symbol rate, more extensive forward error correction capability, etc.)

In an alternative embodiment, port trunking where multiple upstreams are used to transmit data from the same cable modem is also possible to allow a cable modem to have a large bandwidth upstream where needed.

In the preferred embodiment, at least one of the receivers represents a shared upstream receiver shared by a plurality of downstreams.

In the preferred embodiment, the computers in the line cards are programmed by said UMAC process of the shared upstream receiver and the DMAC processes of said transmitters which share the shared upstream receiver to exchange data between said UMAC process and said DMAC processes via the packet switch to allow a flexible number of downstreams to share the a flexible number of upstream receivers.

In the preferred embodiment, the UMAC process monitors traffic load conditions and/or receiver performance and transmitter performance and/or communication difficulties of CMs in the system. The UMAC decides based upon this monitoring if another upstream receiver for an existing upstream or an entirely new upstream needs to be added to alleviate loading conditions. It also decides if another upstream having a lower throughput needs to be added to service CMs that are having difficulty communicating upstream because of signal-to-noise ratio problems or inadequate transmit power. or if the mapping of optical nodes to receivers needs to be changed for load balancing. The UMAC process then cooperates with the DMAC processes in the group of downstream transmitter line cards which are sharing the same upstream receiver to send any messages needed to create a new upstream and controls the upstream mapping switch to alter the mapping of optical nodes to upstream receivers.

In one embodiment, the cable modem termination system comprises one or more downstream transmitter line cards each containing a DOCSIS transmitter having an output coupled to a downstream mapper, and wherein each downstream transmitter line card includes a computer or state machine programmed or structured to implement a downstream media access control (DMAC) process, and having one or more upstream receiver line cards each having a DOCSIS upstream receiver having a radio frequency input coupled to an upstream mapper, and wherein each upstream receiver line card includes a computer or state machine programmed or structured to implement an upstream media access control (UMAC) process, and including a switch fabric coupled to and serving to route packets between the line cards, a storage/cache circuit, a forwarder/application circuit and ports for coupling to a wide area network and local content servers, with the cable modem termination system functioning to serve as the headend of a hybrid fiber coaxial cable system coupled via one or more optical nodes to a plurality of cable modems. In this embodiment, the UMAC and DMAC processes, the DOCSIS transmitters and receivers and the switch fabric and the upstream and downstream mappers cooperate to implement the following functions:

1) creating DOCSIS downstreams and upstreams;
2) implementing a flexible mapping between said downstreams and said optical nodes;
3) mapping one or more downstreams to a one or more shared upstream receivers;
4) implementing a flexible mapping of optical nodes to upstream receivers;
5) carrying out load balancing and communication parameter monitoring so as to create new upstreams and downstreams with channel parameters and burst profiles as needed to meet load balancing considerations or resolve problems some cable modems may be having in communicating with said cable modem termination system.

In some embodiments, the combining of upstreams from different optical nodes to the input of one or more shared receivers is done in the analog domain by switching structures and/or summing nodes or summing amplifiers in the upstream mapper. However, in alternative embodiments, the combining of upstream signals from different optical nodes can be done in the digital domain after the analog-to-digital conversion.

BRIEF DESCRIPTION OF THE DRAWINGS

FIG. 7 is a diagram of how the UMAC schedules non overlapping TDMA or SCDMA or both TDMA and SCDMA bursts for the upstream transmissions of CMs tuned to one of the multiple downstreams which shares an upstream, with the CMs being coupled to four different optical nodes.

FIG. 8 is a diagram of the timing of input bursts from different optical nodes to the input of the shared upstream receiver.

DETAILED DESCRIPTION OF THE PREFERRED AND ALTERNATIVE EMBODIMENTS

Figure 1:
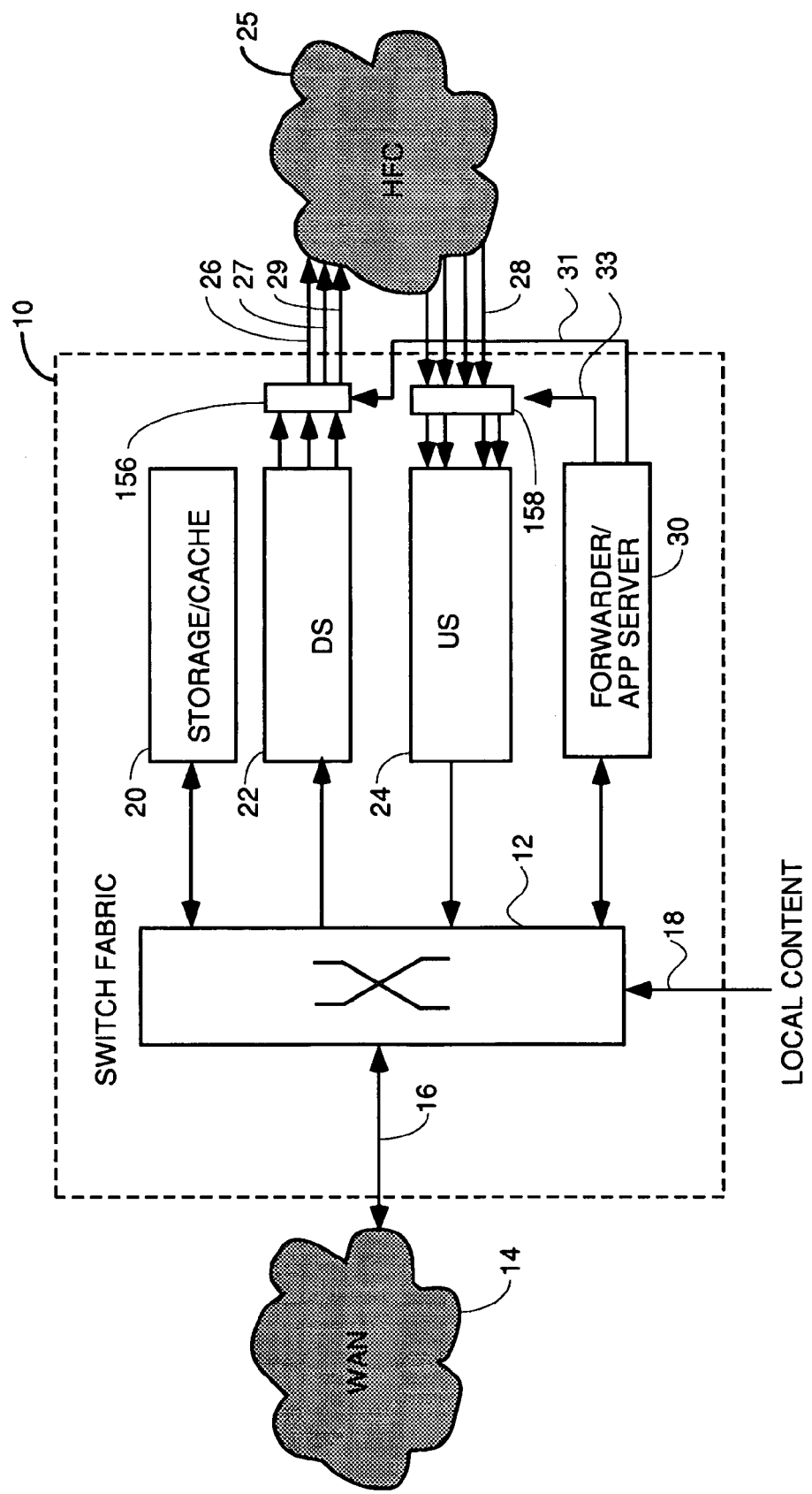
FIG. 1 is a block diagram of a new third generation CMTS architecture.

FIG. 1 is a block diagram of a new third generation CMTS architecture and having circuitry which is compliant with DOCSIS 1.0, 1.1 and 2.0 specifications, all of which are hereby incorporated by reference. The CMTS 10 is comprised of a packet switch 12 for coupling to a wide area network 14 such as the internet via data path 16, local content provider servers such as video-on-demand (VOD) servers (not shown) via data path 18. Inside the CMTS, the switch fabric is coupled to a storage/cache memory 20, one or more downstream transmitter line cards, represented collectively at 22.

The downstream transmitters each have an RF output which is coupled to one or more optical nodes (not shown) of a hybrid fiber coaxial cable system (HFC) 25 via a downstream mapper and splitter/combiner 156 (downstream mapping switch). Each downstream transmitter line card functions to transmit one or more MPEG transport streams and DOCSIS downstreams on a QAM modulated downstream channel to one or more optical nodes in HFC system 25, as dictated by a downstream mapping switch 156.

The downstream mapping switch 156 has a plurality of outputs 27, 29 and 26 for coupling to one or more optical nodes of HFC system 25. It also has an input coupled to the RF output of each downstream transmitter. Downstream mapping switch also has a control input 31 for receiving control signals which control which transmitter outputs are coupled to which optical nodes. In the embodiment shown, these switching control signals are supplied on line 31 from a forwarder/application server 30 which is described below as running upstream and downstream media access control processes. In alternative embodiments, each downstream transmitter line card in collection 22 has its own microprocessor running a downstream media access control process (DMAC) and control signals for downstream mapping switch 156 are generated by these DMAC processes in cooperation with upstream media access control processes running in one or more upstream receiver line cards shown collectively at 24.

The switch fabric 12 is also coupled to one or more upstream receiver line cards shown collectively at 24. Each receiver line card functions to receive one or more DOCSIS or other upstreams 28 from one or more optical nodes in HFC system 25, as dictated by an upstream mapper switch 158. Each receiver line card has a microprocessor which runs an upstream media access control (UMAC) process in alternative embodiments, but in the embodiment shown, all UMAC processes are executed in forwarder/application server 30.

The upstream mapper switch 158 has one or more outputs coupled to the RF inputs of the receiver line cards. The mapper switch 158 also has one or more inputs for coupling to optical nodes in said HFC system 25. Control over which optical nodes are coupled to which receiver inputs is by way of control signals on line 33 from forwarder/application server 30. In alternative embodiments, the UMAC processes in the line cards generate the control signals which control the mapping implemented by upstream mapper switch 158. Data is exchanged as described later herein between UMAC and DMAC processes to map downstreams to shared upstreams and coordinate DOCSIS messaging to implement flexible upstream and downstream mapping. Data exchange between UMAC and DMAC processes is via switch fabric 12 in some embodiments and via any other interprocess data exchange path in embodiments where the UMAC and DMAC processes are run in forwarder/application server 30.

A forwarder/application server 30 functions, inter alia, in one embodiment to receive upstream requests from the upstream line cards and to send DOCSIS downstream message and other data to the downstream line card collection 22. The forwarder 30 also controls switch fabric 12 to route messages to the proper servers to fulfill those requests, and runs a downstream media access control (DMAC) process for each downstream and generates downstream media access control (MAC) messages and sending them to the appropriate downstream transmitters by properly controlling switch fabric 12. The forwarder also runs an upstream media access control process for each upstream (UMAC) and passes UMAC data needed by the DMAC processes to the appropriate DMAC processes by suitably controlling switch fabric 12. The forwarder/application server 30 also runs application programs and conditional access programs, and controls the switch fabric 12 to properly direct all packet traffic to the proper destinations. In other embodiments, each line card has its own MAC process for the downstream transmitter or upstream receiver on the card as the case may be. In some embodiments, each upstream receiver linecard can have multiple receivers.

Upstream and Downstream Decoupling

Flexible Mapping of Multiple Downstreams to a Shared Upstream

Figure 2:
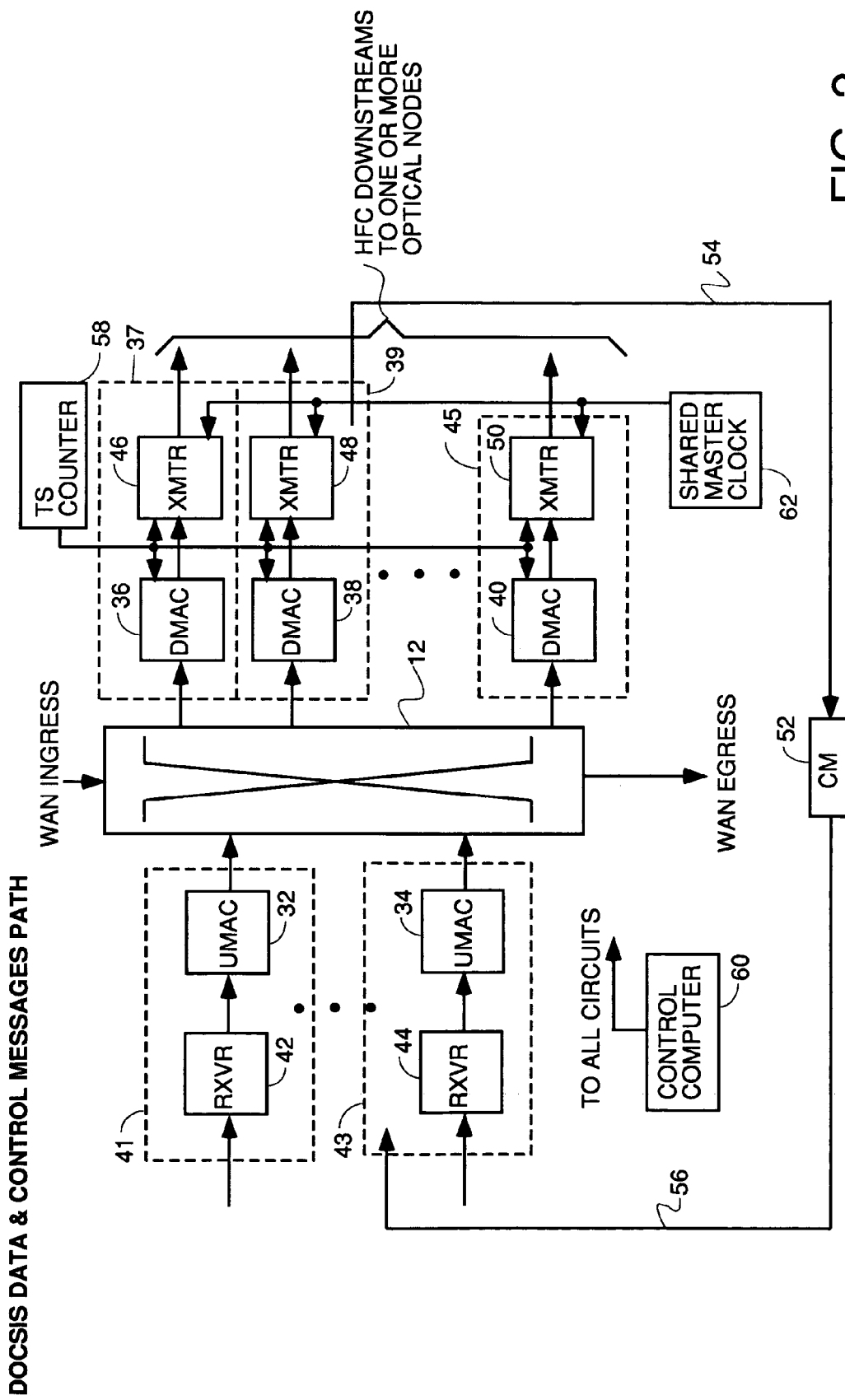
FIG. 2 is a block diagram of the DOCSIS data and control message path in the CMTS.

FIG. 2 is a block diagram of the DOCSIS data and control message path in the CMTS. Upstream and downstream decoupling is about granularity and the ability to add single upstreams as needed and single downstreams as needed and to group them together as needed. The mapping of multiple downstreams to a single upstream is all about coordination of various MAC requirements and messaging among the multiple downstreams and shared upstream. The messaging functions are carried out by Upstream Media Access Control (UMAC) blocks 32 and 34, Downstream Media Access Control blocks (DMAC) 36, 38 and 40, switch 12, upstream receivers 42 and 44, and downstream transmitters 46, 48 and 50.

A first upstream line card 41 is comprised of upstream DOCSIS receiver 42 and a computer or state machine programmed or structured to execute UMAC process 32. A second upstream line card 43 is comprised of upstream DOCSIS receiver 44 and a computer or state machine programmed or structured to execute UMAC process 34. The upstream DOCSIS receivers can be any DOCSIS receiver, and are programmable. This means that the UMAC processes or some other computer can send burst profile and other configuration data to each receiver to configure it to properly tune to, and process any upstream DOCSIS burst type (IUC) to recover the data encoded therein.

A first downstream line card 37 is comprised of DOCSIS transmitter 46 and a computer or state machine programmed or structured to execute DMAC process 36. A second downstream line card 39 is comprised of DOCSIS transmitter 48 and a computer or state machine structured to execute DMAC process 38. Similarly for downstream line card 45. The DOCSIS transmitters can be any transmitters capable of sending DOCSIS downstream messages and data. In other embodiments, each linecard may have a mixed number of upstream receivers and/or downstream transmitters each of which can be grouped by the cooperation of the UMAC and DMAC processes with any other upstream receiver or or other downstream transmitter on any linecard.

Figure 10B:
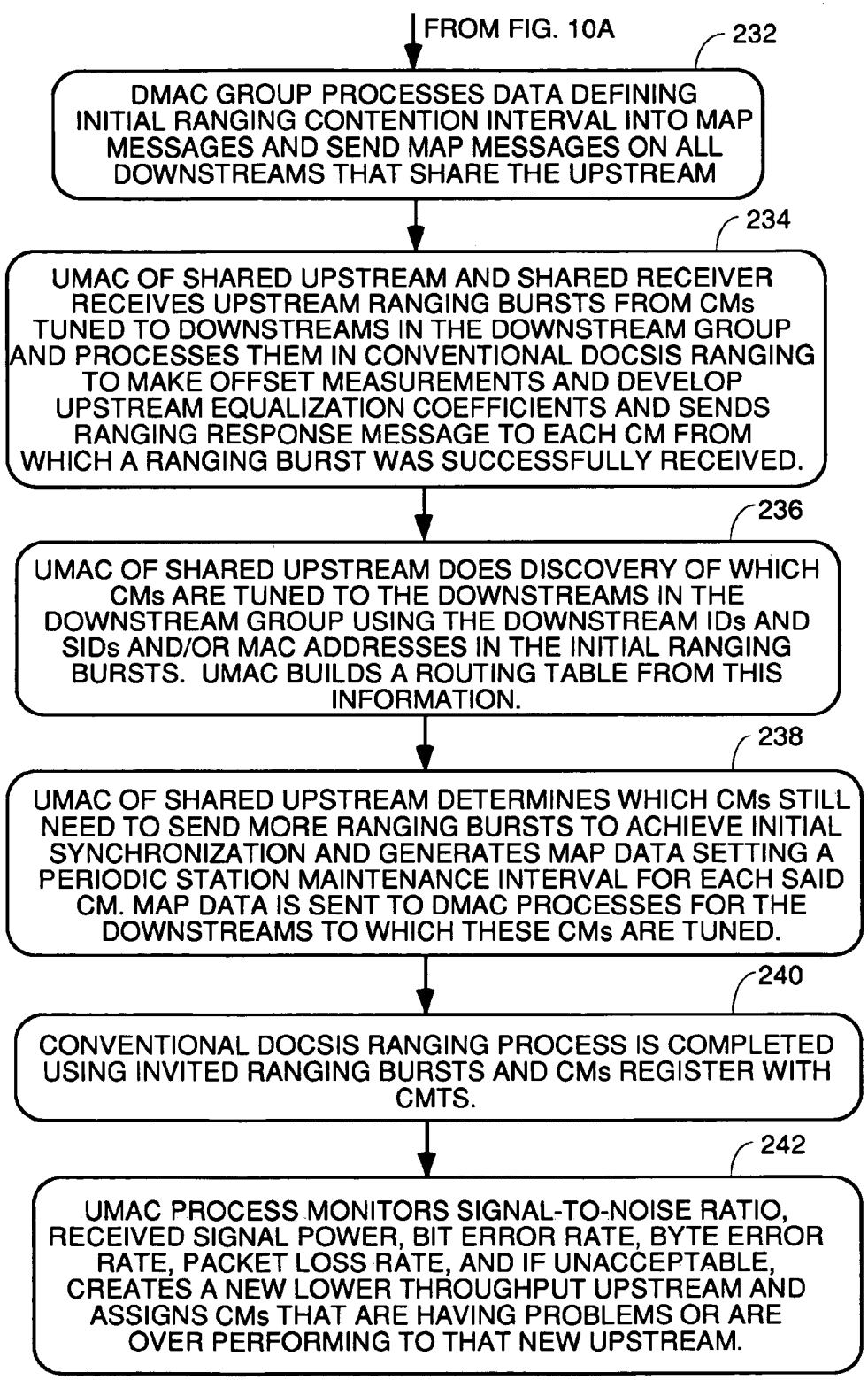
FIG. 10, comprised of FIGS. 10A, 10B, and 10C, there is shown a flowchart for a process for flexible mapping of upstreams and downstreams in the presence of noise aggregation with monitoring for problems and load balancing issues and creation of new upstreams or downstreams to resolve those issues.
Figure 10C:
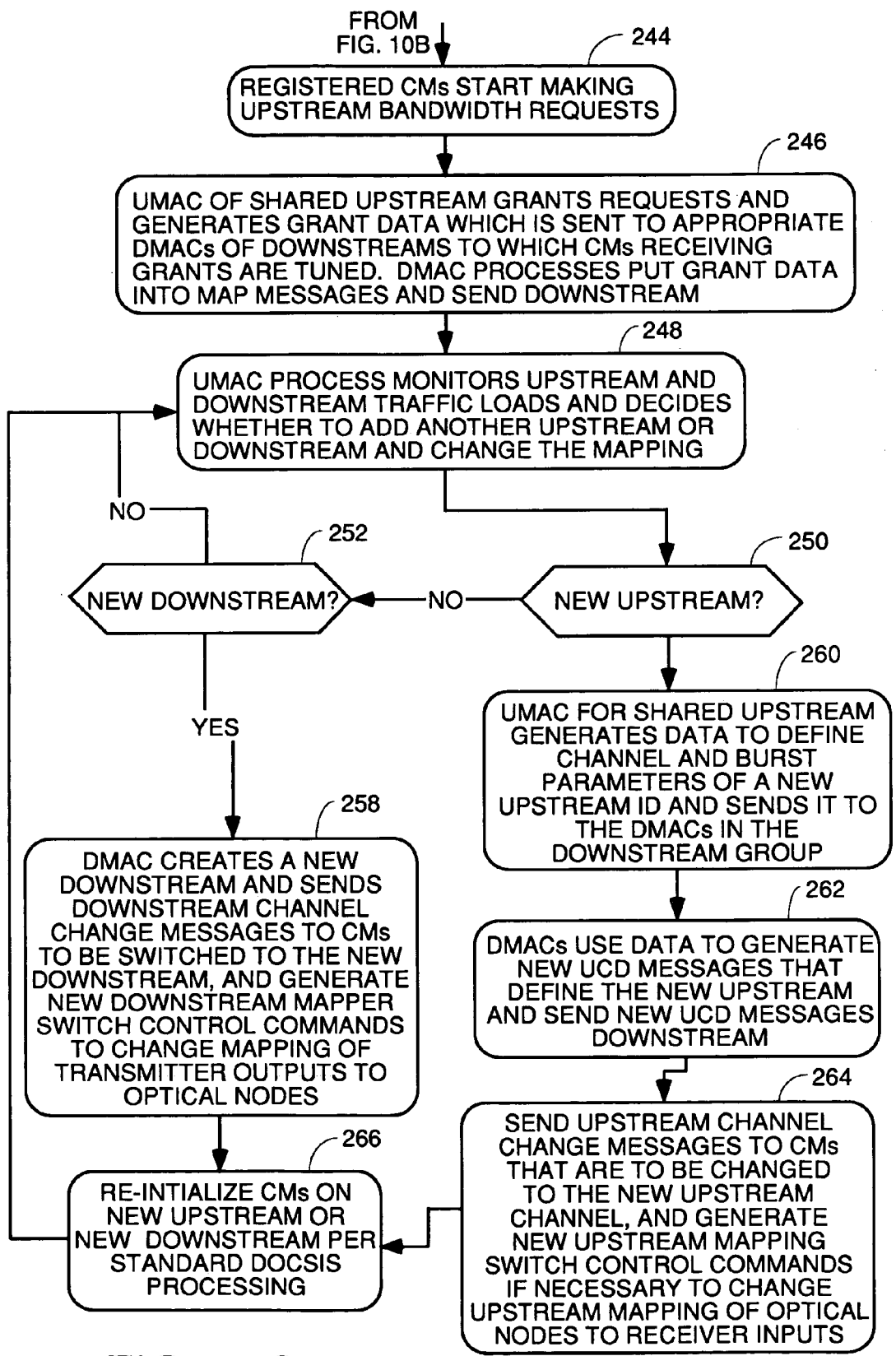
Figure 11A:
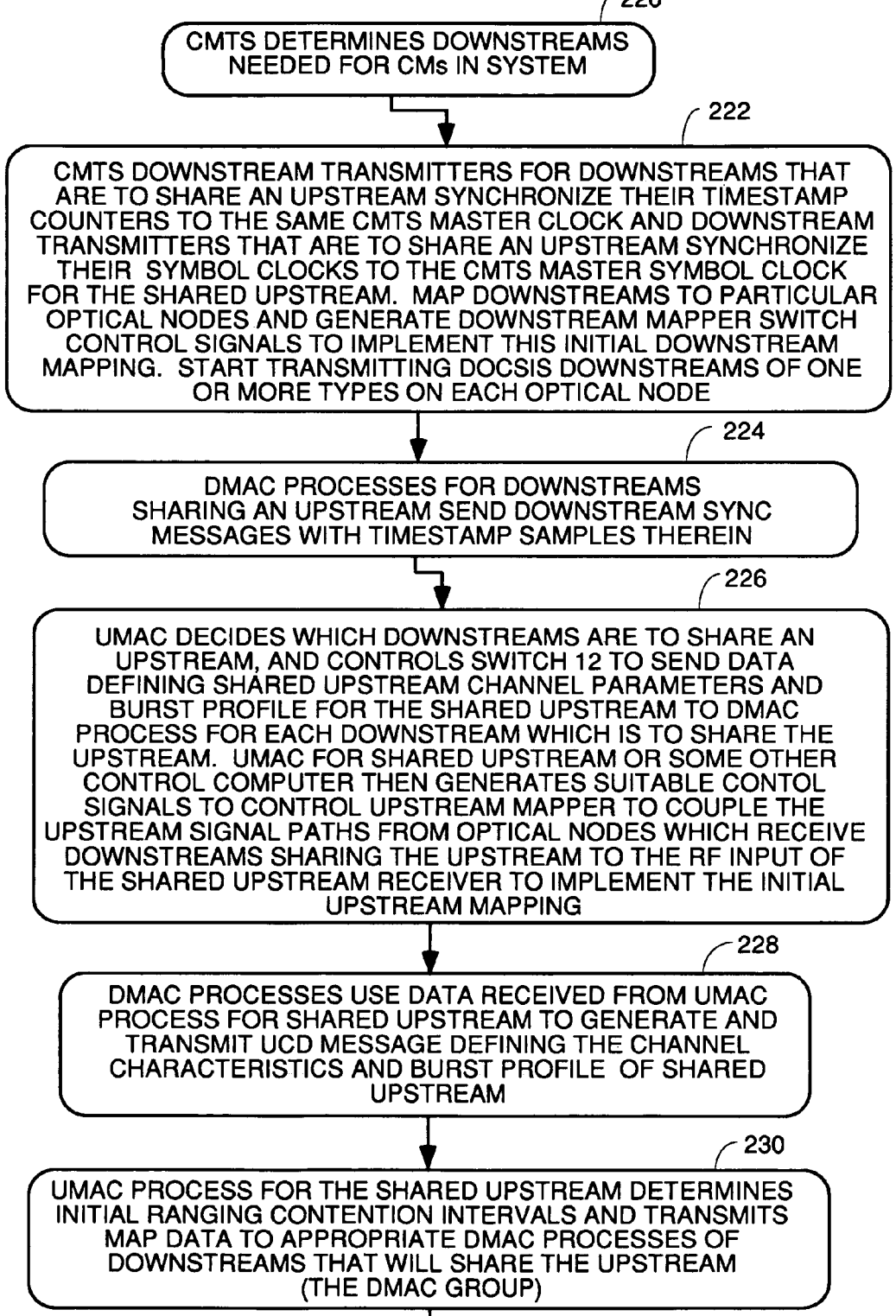
FIG. 11, comprised of FIGS. 11A, 11B, 11C, and 11D is a flowchart of the preferred species within the process genus of the invention for providing flexible mapping of upstream receivers to optical nodes without aggregating noise. The species of FIG. 11 also provides flexible mapping of one or more downstreams to each upstream.
Figure 11B:
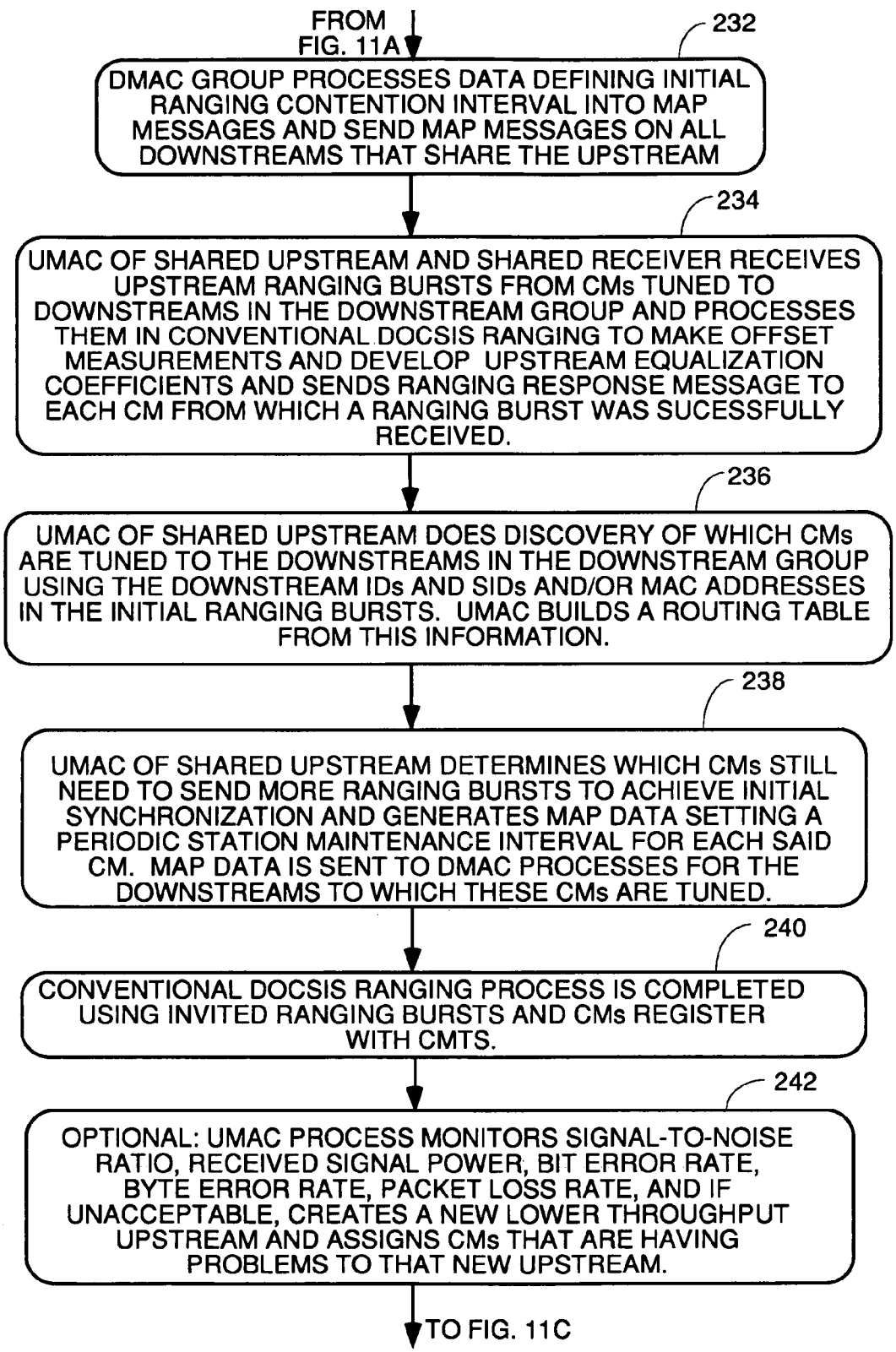
Figure 11D:
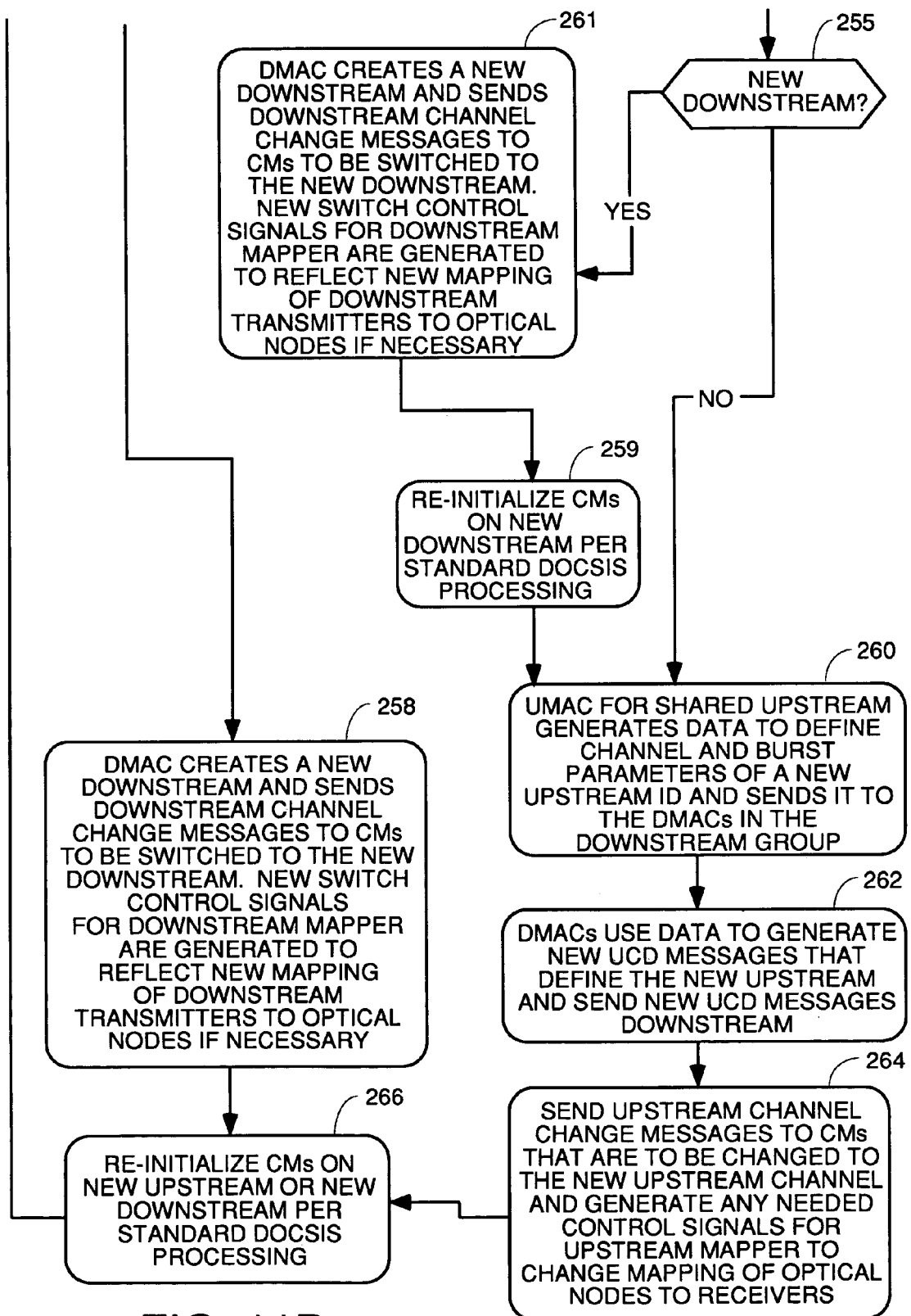

The UMAC and DMAC processes generate and exchange data via switch 12 so as do the necessary DOCSIS message transmission described in the flowcharts of FIGS. 9, 10 and 11. The UMAC and DMAC processes cooperate to control the transmitters and receivers to do necessary messaging and switch control signal generation. The upstream and downstream mappers are not shown but are controlled by the UMAC and DMAC processes in one embodiment. The messaging and switch control signal generation functions and other functions carried out by the UMAC and DMAC processes control the following operations of the CMTS:

1) create DOCSIS downstreams and upstreams and create group(s) thereof;
2) implement a flexible mapping of downstreams to optical nodes;
3) map one or more downstreams to a shared upstream receiver;
4) implement flexible mapping of optical nodes to upstream receivers;
5) carry out load balancing and communication parameter monitoring so as to create new upstreams and downstreams with channel parameters and burst profiles as needed to meet load balancing considerations or resolve problems some CMs may be having in communicating with the CMTS.

Although only two upstream receivers and 3 downstream transmitters are shown, the number of upstreams and downstreams can be less or more in each case. A single Cable Modem (CM) 52 is shown communicating with the CMTS via downstream data path 54 on the HFC and upstream data path 56 on the HFC.

The UMAC and DMAC processes are usually processes run in software in a control computer 60 of the CMTS. The control computer 60 is coupled to all of the CMTS circuits and is programmed to send data to configure transmitters and receivers to transmit and receive in accordance with downstream and upstream channel parameters established by the MAC processes and coordinate the activities of the switch 12, all the MAC processes and the receivers and transmitters to carry out the protocols described herein to decouple the upstreams and downstreams, etc.

The requirements to map multiple downstreams to a shared upstream or upstreams are as follows:

If the shared upstream is time division multiple access (TDMA) only and no DOCSIS 2.0 Synchronous Code Division Multiple Access (SCDMA) bursts are allowed, then the only requirements on the downstreams are as follows. In the claims, the downstreams which have these characteristics and which share an upstream are referred to as coordinated downstreams.

1) Each downstream transmitter for a downstream that shares an upstream must have a timestamp counter or something equivalent which counts the same master clock. Fixed offsets in the timestamp counts are permissible, but no drift is permissible. Thus, transmitters 46, 48 and 50 must each have a timestamp counter which is synchronized with the timestamp counters of the other transmitters which share the same upstream receiver (or synchronized to maintain a small, constant offset). Alternatively, all downstream transmitters in a group share the same timestamp counter 58. In this embodiment, there may be a separate timestamp counter for each group of downstream transmitter linecards which share the same upstream receiver linecard (all counting ticks of the CMTS master clock or a timestamp counter clock derived from the CMTS master clock), so if there are several groups of downstreams, each sharing an upstream, each group must have its own master timestamp counter which counts the master clock of the CMTS or some clock derived therefrom. In an alternative embodiment, all downstream linecards receive timestamp counts from a single timestamp counter which counts ticks of the CMTS master clock. Generally, all timestamps in the CMTS are synchronized. This is especially important for redundancy considerations so as to be able to replace a faulty receiver or transmitter or faulty linecard with a new receiver or transmitter or another linecard. If the timestamps are synchronized, the replacement will be smoother and easier to implement. The receiver linecards also have to receive timestamps that are synchronized to the downstream timestamps although the receiver timestamp can have a fixed offset to the transmitter timestamp. All these alternative embodiments are intended to be within the scope of the term "timestamp counter means" in the claims.

2) Each downstream transmitter must transmit downstream DOCSIS sync messages on the schedule restraints imposed by the DOCSIS specifications and which contain the timestamp counts. The CMs use these sync message timestamps to keep a local timestamp counter in each CM "synchronized" to the timestamp counter of the downstream transmitter to which the CM is tuned. Synchronized CM timestamp counters means a proper offset between the timestamp counts exists so that when a CM gets an upstream timeslot or minislot grant after requesting bandwidth, the CM can use its timestamp counter to determine the correct time to transmit so that its bursts arrive at the CMTS aligned in time with the boundaries of the assigned timeslots or minislots. CMs achieve synchronization by carrying out the ranging process specified in the DOCSIS specifications. It is the responsibility of the DMAC processes to generate these sync messages and send them to the downstream transmitters for transmission. The DMAC processes receive the timestamp counts from the timestamp counter 58 and incorporate them into the sync messages.

3) Each downstream transmitter must transmit a DOCSIS Upstream Channel Descriptor (UCD) message which defines the shared upstream in terms of the same parameters, with each UCD message containing the downstream ID of the downstream it is transmitted upon and the upstream ID of the shared upstream. Basically, the transmission characteristics of each logical channel, as defined by the corresponding UCD message, are separated into three portions: 1) channel parameters; 2) burst profile attributes, and 3) user unique parameters. In the appended claims, the term "burst parameters" is intended to include all those channel parameters, burst profile attributes and user unique parameters needed by the shared back end demodulator to properly process each burst. The logical channel parameters include: a) the symbol rate which can be any one of 6 different rates from 160 ksym/sec to 5.12 Msym/sec in octave steps; b)

the center frequency; and c) the 1536-bit preamble superstring that is prepended to at least some bursts; and d) the SCDMA channel parameters. These characteristics are shared by all users on a given channel or sub-channel (hereafter logical channel may be used to refer to either channel or sub-channel). The burst profile transmission characteristics of a logical channel, in the preferred embodiment, include: modulation (QPSK, 64 QAM, 128 QAM etc.), differential encoding on or off; Trellis or TCM encoding on or off; preamble length, preamble value offset; preamble type (QPSK 0 or QPSK1), RS error correction T value from 0 to 16 where 0 is no FEC bits to 16 for the maximum where the number of codeword parity bytes is 2×T, RS codeword length, scrambler seed, max burst length in minislots, guardtime from 5 to 255 symbols for TDMA channels and 1 symbol for SCDMA channels, last codeword length (fixed or shortened), scrambler on or off, byte interleaver depth, byte interleaver block size, SCDMA spreading on or off, codes per subframe, and SCDMA interleaver step size. User unique parameters may vary from user to user even when on the same channel and same burst type and include such things as: power level; offset frequency (defines center frequency of channel to transmit on); ranging offset to achieve minislot boundary alignment at CMTS (which also achieves upstream chip clock alignment between the upstream chip clock generated at the CMTS and the chip clock embedded in the received signal at the CMTS receiver—a state which is referred to herein as "phase coherence"), burst length in minislots if variable on the specified channel (changes from burst to burst); and the transmit equalizer coefficients (up to 64 coefficients specified by 4 bytes per coefficient—2 real and 2 complex). The UMAC process for the shared upstream defines the parameters of the upstream and sends those parameters through switch 12 to the DMAC processes of each downstream which shares the upstream. Since the UMAC and DMAC processes are usually executed in software in computer 60, transfer of the data to the DMAC process for composition of the UCD messages may be by any other interprocess data transfer mechanism.

4) Each downstream transmitter must transmit a MAP message which tells the CMs when bursts may start and stop and defining when initial ranging contention intervals and periodic station maintenance (ranging by invitation) intervals exist on the shared upstream. CMs can only transmit upstream ranging bursts during the appropriate initial ranging contention interval or periodic station maintenance interval in response to the MAP message using the downstream ID from the UCD message in the downstream to which the CM is tuned. This ranging process is an attempt to coordinate with the CMTS by an exchange of messages to set a proper offset into the CM timestamp counter so as to achieve synchronization as that term is defined above. The MAP messages must be coordinated so that they all define the same ranging contention interval in the upstream and there is no conflict between grants on the upstream between different CMs tuned to different downstreams. The UMAC process for the shared upstream determines when the initial ranging contention intervals will be, when the periodic station maintenance intervals will be for each CM and coordinates the grants for all CMs tuned to all downstreams to avoid conflicts. The data defining when the initial station maintenance intervals are is sent by the shared upstream UMAC to each DMAC process for a downstream that is linked to the shared upstream and is put into the MAP messages composed by that DMAC process for its downstream. The data developed by the shared upstream UMAC defining when the periodic station maintenance interval is for a particular CM coupled to a downstream is sent to just the DMAC that is generating the MAP messages for the downstream to which the CM is tuned and is incorporated into the MAP messages for the downstream to which the CM is tuned. While ranging and initial training as defined in the DOCSIS specification is completed, the UMAC process for the shared upstream receives the ranging bursts, and, with the aid of circuitry in the receiver coupled to the shared upstream, performs ranging measurements. These ranging measurements determine from the ranging burst of each CM time, frequency and power offsets for that particular CM. The UMAC process also reads upstream equalization coefficients developed by the shared upstream receiver from the ranging burst of the CM which equalize the channel. These offsets and equalization coefficients are sent by the UMAC process of the shared upstream to the DMAC process for the downstream to which the CM is tuned which sent the ranging burst. The DMAC process then includes the offsets and equalization coefficients in a DOCSIS ranging response message which it composes and sends to the CM. The CM then makes the requested offset adjustments to achieve synchronization and convolves the received equalization coefficients with the existing upstream equalization coefficients in its transmit filter to develop new upstream equalization coefficients which will equalize the upstream channel. During the ranging process or the subsequent DOCSIS registration process, the UMAC of the shared upstream does a discovery process to determine which CMs are tuned to which downstreams linked to a particular shared upstream. Each ranging burst includes the downstream ID of the downstream to which the CM which sent the ranging burst is tuned so the UMAC process can determine to which downstream each CM which sends a ranging burst is tuned.

5) The UMAC of each shared upstream builds routing tables for each downstream from information in the ranging bursts of each CM. Specifically, if the ranging bursts are used, the CMTS must be able to build the routing table for each downstream from the downstream ID information and the SID or something equivalent such as the MAC address which identifies the CM which sent each initial ranging burst so as to automatically determine which CMs are listening to each downstream. Initial ranging bursts contain an initialization Service ID (SID) if the CM is attempting to join the network, and contains a temporary SID if the CM is not yet registered and is changing upstreams as directed by a downloaded parameter file. The CMs initially join the best valid DOCSIS downstream for the CM type when the CM first powers up and then listens for UCD and MAP messages on that downstream. The CM then transmits an initial ranging burst during the initial ranging contention interval set in the MAP message for the upstream defined in the UCD message. This initial ranging burst contains the downstream ID and an initialization SID and a MAC address which identifies the CM. The CMTS controls which upstream and which downstream each CM is assigned to and can dynamically change the assignments by sending suitable downstream messages. Thus, the mapping of multiple downstreams to a shared upstream can be changed to add more downstreams or fewer downstreams for load balancing and to change the upstream, all by generating the appropriate channel change messages in the shared upstream UMAC and routing them to the appropriate DMACs for transmission to the CMs which are to change. The routing tables are then changed when a CM re-ranges or re-registers after a change in downstream or upstream.

If the upstream allows SCMDA bursts (the following requirements would also work if the upstream allows both SCDMA and TDMA bursts), the requirements are as follows. In the claims, the downstreams which have these characteristics and which share an upstream are referred to as coordinated downstreams. All the description of operation of and cooperation between the UMAC and DMAC processes given above in the TDMA only embodiments apply equally here unless otherwise indicated.

1) Each downstream transmitter for a downstream that shares an upstream must have a timestamp counter or something equivalent which counts the same CMTS master clock. Fixed offsets in the timestamp counts are permissible, but no drift is permissible. Shared timestamp counter 58 which counts the CMTS master clock (typically part of the TS counter 58 or control computer 60) will serve this purpose. Alternatively, all downstream transmitters in a group share the same timestamp counter 58. In this embodiment, there may be a separate timestamp counter for each group of downstream transmitter linecards which share the same upstream receiver linecard (all counting ticks of the CMTS master clock or a timestamp counter clock derived from the CMTS master clock), so if there are several groups of downstreams, each sharing an upstream, each group must have its own master timestamp counter which counts the master clock of the CMTS or some clock derived therefrom. In an alternative embodiment, all downstream linecards receive timestamp counts from a single timestamp counter which counts ticks of the CMTS master clock. All these alternative embodiments are intended to be within the scope of the term "timestamp counter means" in the claims.

2) Each downstream transmitter may use the same frequency symbol clock and may use the same symbol rate but the symbol clocks on all downstreams must be locked in frequency and phase if they are the same frequency and must be at least locked in phase if the symbol clocks are at different frequencies using an M/N relationship where M and N are integers. When the upstream channel allows Synchronous Code Division Multiplexed (SCDMA) bursts, all the downstream channels may use different or the same symbol clock frequency, but the symbol clock frequency should be locked to the same master clock in the CMTS (generally 10.24 MHz). The symbol clocks can be locked to the common CMTS master clock via a phase locked loop using M/N ratios. The M/N ratio is different if the symbol rate for the upstream is different than the symbol rate for the downstream. The cable modem is able to synchronize its upstream symbol clock in this way using the recovered symbol clock of whatever downstream to which it is tuned. The recovered downstream symbol clock is used as a reference signal having frequency N to the PLL. The output of the PLL at frequency M is the upstream symbol clock. In other words, all transmitters in a group sharing an upstream must be locked to the same CMTS master clock (10.24 MHz in the preferred embodiment) even if the symbol clocks counting these master clock ticks are operating at different frequencies. This may be done by locking the symbol clocks in phase to the CMTS master clock using a PLL for downstreams which are sharing a single upstream. In FIG. 2, transmitters 46, 48 and 50 are shown as sharing the same master clock 62 and the timestamp counter 58 count ticks of this master clock 62. Transmitters in a group may share a symbol clock and timestamp counter in embodiments where the entire group has the same symbol clock frequency and same timestamp counts. This can also be the case for all downstream groups, i.e., all downstream groups share the same symbol clock and/or timestamp count. The number of downstream transmitters sharing any particular symbol clock or timestamp counter may vary as may the number of groups of downstream transmitters sharing a symbol clock or timestamp counter. A separate symbol clock and separate timestamp counter for each transmitter may be used each with a different frequency so long as the M/N ratio and synchronization relationship identified above is maintained so that all the symbol clocks and timestamp counters in all groups of downstreams are kept in at least phase synchronization with the master clock 62.

3) The CMs must each recover the downstream symbol clock of the downstream to which the CM is tuned, and must synchronize its upstream symbol clock to the downstream symbol clock using an M/N relationship between the frequency and phase of the downstream symbol clock versus the frequency and phase of the upstream symbol clock. M and N are integers, and the upstream symbol clock is set at a frequency suitable to generate spread spectrum bursts.

4) Each downstream transmitter must transmit sync messages or something equivalent which contain the timestamp counts which the CMs can use to keep a local timestamp counter in each CM "synchronized" to the timestamp counter of the downstream transmitter the CM is tuned to. Synchronized means a proper offset between the timestamp counts exists so that when a CM gets an upstream timeslot or minislot grant, it can use its timestamp counter to determine the correct time to transmit so that its bursts arrive at the CMTS aligned in time with the boundaries of the assigned timeslots or minislots. CMs achieve synchronization by carrying out the ranging process specified in the DOCSIS specifications. It is the responsibility of the DMAC processes to generate these sync messages and send them to the downstream transmitters for transmission. The DMAC processes receive the timestamp counts from the timestamp counter 58 and incorporate them into the sync messages.

5) Each downstream transmitter must transmit a UCD message or something equivalent which defines the shared upstream in terms of the same parameters, with each UCD message containing the downstream ID of the downstream it is transmitted upon and the upstream ID of the shared upstream. The UMAC process for the shared upstream defines the parameters of the upstream and sends those parameters through switch 12 to the DMAC processes of each downstream which shares the upstream. Since the UMAC and DMAC processes are usually executed in software in computer 60, transfer of the data to the DMAC process for composition of the UCD messages may be by any other interprocess data transfer mechanism.

6) Each downstream transmitter must transmit a MAP message which tells the CMs when initial ranging contention intervals and periodic station maintenance (ranging by invitation) intervals exist on the shared upstream. CMs can only transmit upstream ranging bursts in response to the MAP message using the downstream ID from the UCD message in the downstream to which the CM is tuned. This ranging process is an attempt to coordinate with the CMTS by an exchange of messages to set a proper offset into the CM timestamp counter so as to achieve synchronization as that term is defined above. The MAP messages must be coordinated so that they all define the same ranging contention interval in the upstream and there is no conflict between grants on the upstream between different CMs tuned to different downstreams. The UMAC process for the shared upstream determines when the initial ranging contention intervals will be, when the periodic station maintenance intervals will be for each CM and coordinates the grants for all CMs tuned to all downstreams to avoid conflicts. The data defining when the initial station maintenance intervals are is sent by the shared upstream UMAC to each DMAC process for a downstream that is linked to the shared upstream and is put into the MAP messages composed by that DMAC process for its downstream. The data developed by the shared upstream UMAC defining when the periodic station maintenance interval is for a particular CM coupled to a downstream is sent to just the DMAC that is generating the MAP messages for the downstream to which the CM is tuned and is incorporated into the MAP messages for the downstream to which the CM is tuned. While ranging and initial training as defined in the DOCSIS specification is completed, the UMAC process for the shared upstream receives the ranging bursts, and, with the aid of circuitry in the receiver coupled to the shared upstream, performs ranging measurements. These ranging measurements determine from the ranging burst of each CM time, frequency and power offsets for that particular CM. The UMAC process also reads upstream equalization coefficients developed by the shared upstream receiver from the ranging burst of the CM which equalize the channel. These offsets and equalization coefficients are sent by the UMAC process of the shared upstream to the DMAC process for the downstream to which the CM is tuned which sent the ranging burst. The DMAC process then includes the offsets and equalization coefficients in a DOCSIS ranging response message which it composes and sends to the CM. The CM then makes the requested offset adjustments to achieve synchronization and convolves the received equalization coefficients with the existing upstream equalization coefficients in its transmit filter to develop new upstream equalization coefficients which will equalize the upstream channel. During the ranging process or the subsequent DOCSIS registration process, the UMAC of the shared upstream does a discovery process to determine which CMs are tuned to which downstreams linked to a particular shared upstream. Each ranging burst includes the downstream ID of the downstream to which the CM which sent the ranging burst is tuned so the UMAC process can determine to which downstream each CM which sends a ranging burst is tuned.

7) The UMAC process of the shared upstream builds routing tables for each downstream from information in the ranging bursts or registration messages of each CM. Specifically, the UMAC process of the shared upstream must be able to build the routing table for each downstream from the downstream ID information in the ranging bursts and the SID or something equivalent such as the MAC address which identifies the CM which sent each initial ranging burst. The routing table allows the UMAC process to determine which CMs are tuned to each downstream so that routing of periodic station maintenance minislot specifications and upstream bandwidth grants for specific CMs may be routed to the DMAC process for the downstream to which the CM is tuned. Initial ranging bursts contain an initialization Service ID (SID) if the CM is attempting to join the network, and contains a temporary SID if the CM is not yet registered and is changing upstreams as directed by a downloaded parameter file. The CMs initially join the best valid DOCSIS downstream for the CM type when the CM first powers up and then listens for UCD and MAP messages on that downstream which define the parameters of the linked upstream and times when certain types of bursts may be transmitted. The CM then transmits an initial ranging burst during the initial ranging contention interval set in the MAP message for the upstream defined in the UCD message. This initial ranging burst contains the downstream ID and an initialization SID and a MAC address which identifies the CM. The CMTS controls which upstream and which downstream each CM is assigned to and can dynamically change the assignments by sending suitable downstream messages. Thus, the mapping of multiple downstreams to a shared upstream can be changed to add more downstreams or fewer downstreams for load balancing and to change the upstream, all by generating the appropriate channel change messages in the shared upstream UMAC and routing them to the appropriate DMACs for transmission to the CMs which are to change. The routing tables are then changed when a CM re-ranges or re-registers after a change in downstream or upstream or subsequently during data transmission since every payload data burst also includes the downstream ID.

The CMTS uses an automatic discovery process to determine the CMs on each downstream. This is done by interrupting the downstreams when the new CMTS is installed. This causes each CM to search for a valid downstream and latch onto the first one they find. The new CMTS then establishes multiple downstreams all mapped to the same upstream. On each downstream, a MAP message (coordinated to define the same ranging interval) is sent which tells the CMs listening to that downstream when an initial ranging contention window is on the upstream. Each downstream transmitter then also sends a UCD message which defines the shared upstream using the same parameters and contains the downstream ID on which it was sent and the shared upstream ID. The CMs respond to the MAP message by sending an initial ranging burst message. This message has the downstream ID the CM is listening to from the UCD message and a MAC address and a SID which identifies the CM. The CMTS uses the SID and downstream ID in each upstream ranging burst to build a routing table which identifies which CMs are listening to each downstream.

Flexible Termination of Optical Nodes with Upstream Receivers

Figure 3:
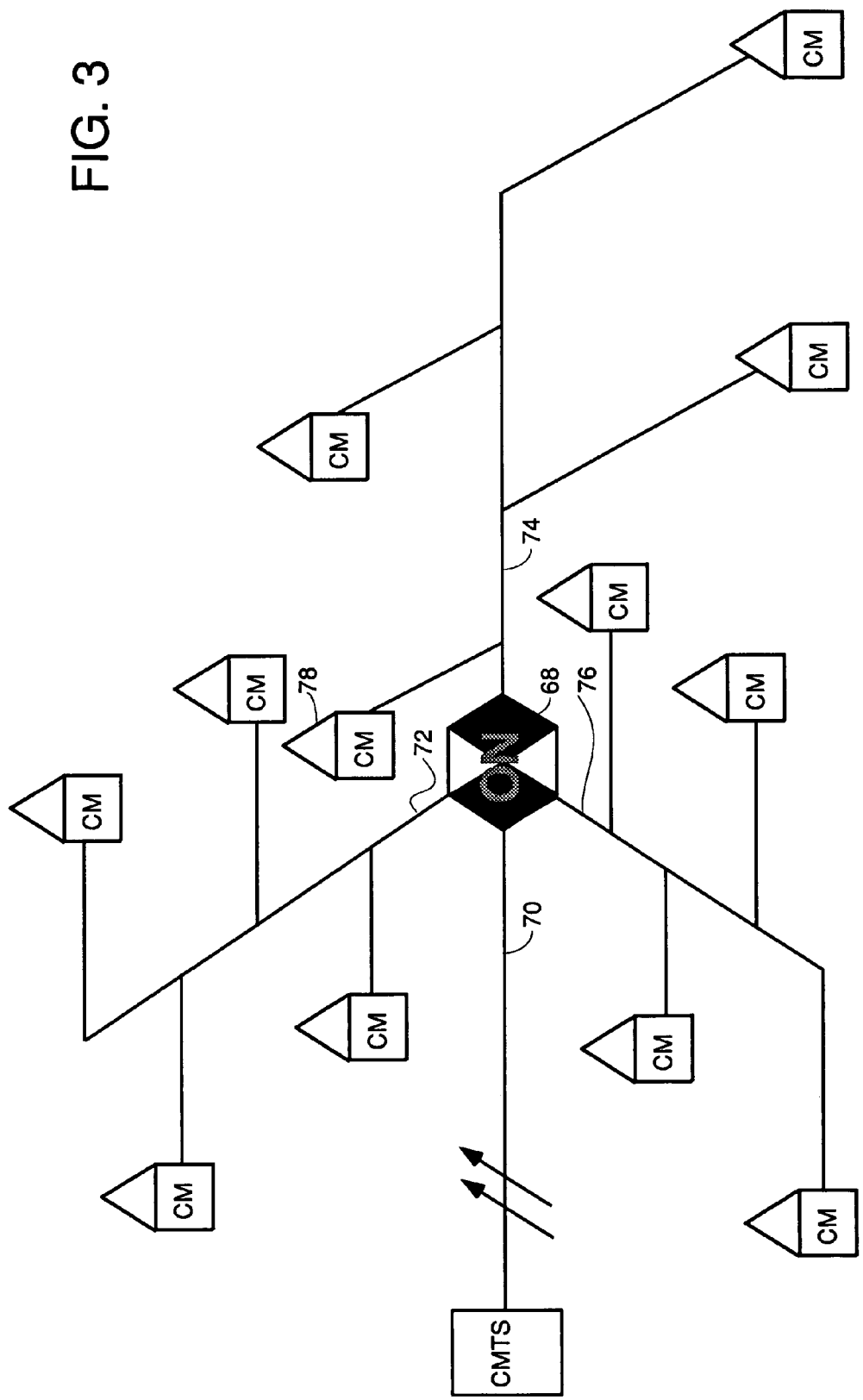
FIG. 3 is a diagram of a typical HFC system with an optical node feeding a plurality of coaxial cables coupled to cable modems.

FIG. 3 is a diagram of a typical HFC system with an optical node feeding a plurality of coaxial cables coupled to cable modems. Optical node 68 sends one or more upstream channels and receives one or more downstream channels via optical fiber 70. The optical node distributes one or more downstream channels on a plurality of coaxial cables 72, 74 and 76 to a plurality of cable modems (CMs) of which CM 78 is typical. The optical node also receives one or more upstream channels from the CMs on one or more different frequencies and converts them to light signals for upstream transmission on fiber 70 to the CMTS.

Figure 4:
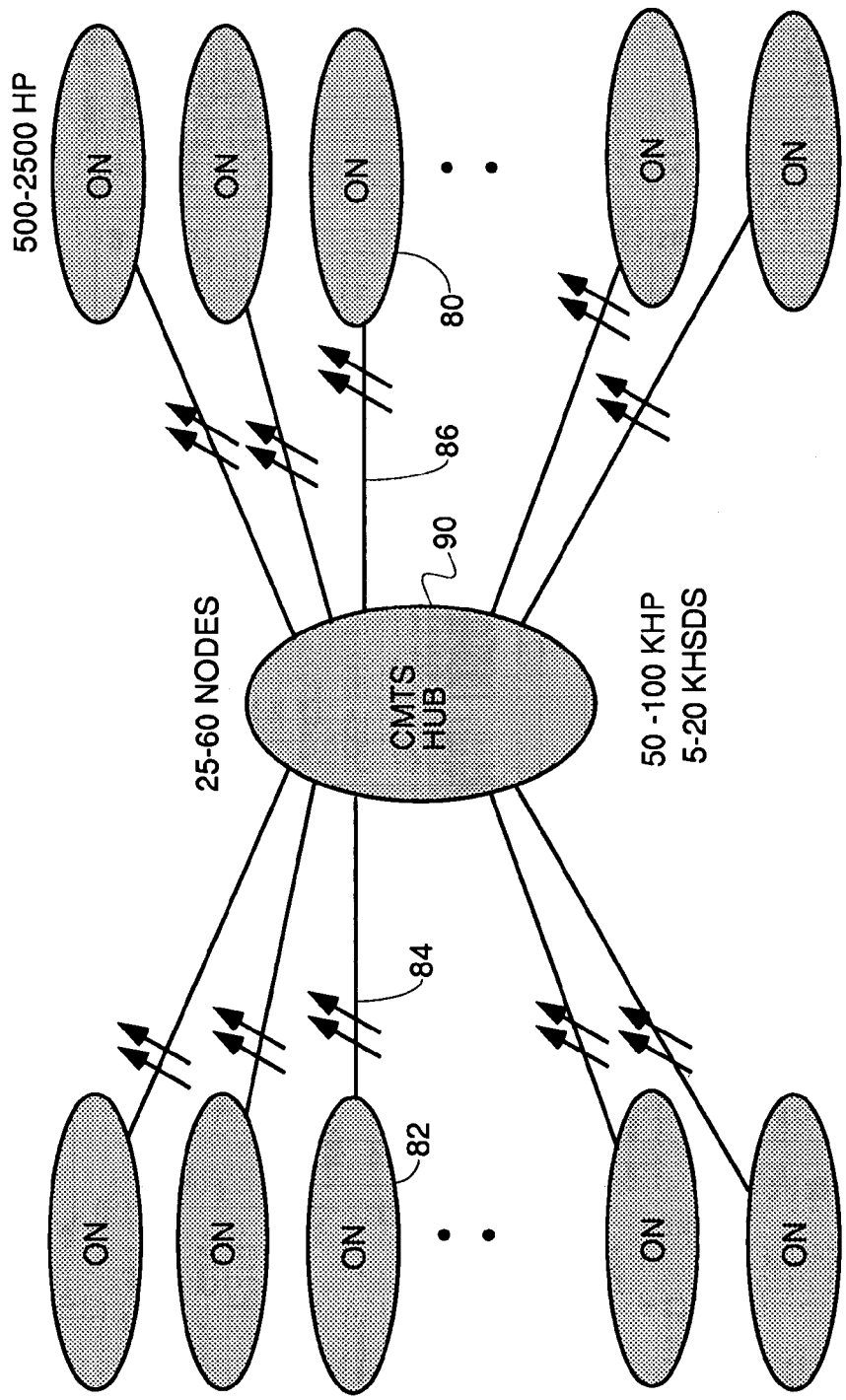
FIG. 4 is a diagram of a typical HFC network star topology where a CMTS terminate multiple optical nodes.

FIG. 4 is a diagram of a typical HFC network star topology where a CMTS terminate multiple optical nodes. Optical nodes 80 and 82 are typical of a plurality of optical nodes, all of which send and receive data via a plurality of optical fibers such as 84 and 86. A CMTS 90 has a plurality of transmitters and receivers (not shown) which are coupled to the optical fibers. Each optical node must be terminated in at least one upstream receiver and receive one or more downstreams from one or more downstream transmitters. Multiple optical nodes can be terminated in the same upstream receiver by summing the signals from the different optical nodes.

Conventional DOCSIS compliant CMTS allows sharing of a downstream by multiple upstreams. What is believed to be new in the invention is provision of the ability to add one or more upstreams as needed and dynamically change the termination of optical nodes to new upstream receivers as well as flexible mapping of downstreams to optical nodes and sharing of an upstream between a flexible number of downstreams. In some embodiments this dynamic mapping of multiple optical nodes to one or more receivers can be done by summing of multiple optican nodes to one receiver, or by establishing different logical upstream channels each handled by a different receiver, each mapped to one or more optical nodes. Summing of optical node signals aggregates noise, so a way of switching so as to combine signals from different optical nodes without noise aggregation is also disclosed herein. In the preferred embodiment, a switching protocol for the radio frequency signals from the optical nodes is used. This switching protocol does not aggregate noise. Changes to the switch mapping for the switching protocol is implemented when new upstream receivers are added or new upstream channels with different IDs are added. Further, the new CMTS structure allows mapping of one or more downstreams to a shared upstream for each upstream added and dynamic changing of the mapping between downstreams and upstreams as conditions dictate or as a cable operator desires. The downstream transmitters in each group can be located on different linecards.

Flexible Mapper Apparatus

Figure 5:
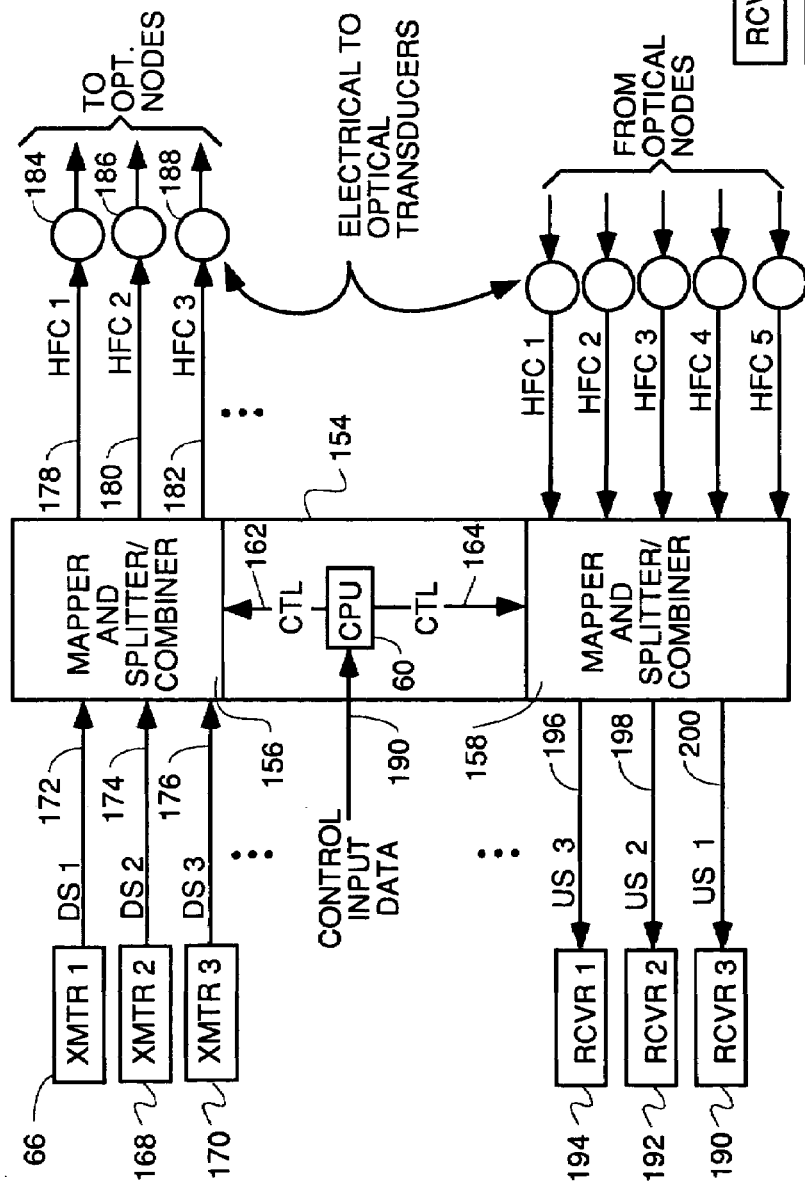
FIG. 5 a block diagram of a flexible mapper which can be used to flexibly map multiple downstream transmitters of a CMTS to multiple optical nodes and to flexibly map multiple optical nodes to termination in one or more upstream receivers.

FIG. 5 a block diagram of a flexible mapper which can be used to flexibly map multiple downstream transmitters of a CMTS to multiple optical nodes and to flexibly map multiple optical nodes to termination in one or more upstream receivers. A flexible mapper 154 is comprised, in part, of a downstream mapper and splitter/combiner 156 coupled to a plurality of CMTS downstream transmitters 166, 168, 170, etc. The flexible mapper is also comprised of an upstream mapper and splitter/combiner 158 which is coupled to a pluarality of optical nodes and a plurality of CMTS upstream receivers 194, 192 and 190, etc. The mappers and splitter/combiner circuitry is controlled by computer or other control logic 160. Computer 160 can be the same computer as computer 60 in FIG. 2 or a separate computer dedicated to controlling the flexible upstream and downstream mappings.

The function of the computer or control logic 160 is to receive information from the upstream and downstream media access control process or processes or some other source such as a control panel operated by the cable operator and suitably control the mapper 154 to implement the upstream and downstream mappings. The downstream mapping information received is about which downstreams are to be transmitted on which HFC systems, and which downstreams are to be mapped to which upstreams. The upstream information received is about which optical nodes are to be terminated in which upstream receivers. The computer and control logic then generates suitable control signals on line 162 and 164 to cause the desired mapping in the mappers 156 and 158.

In summary, the function of the DS mapper 156 is to flexibly couple M downstreams to N optical nodes and have the mapping controlled electronically so that it can be easily changed. Whatever switching, splitting and/or combining of downstream DOCSIS or other data streams that is necessary to accomplish this M to N mapping function will be performed automatically. Thus, for example if three downstreams on different frequencies are to be combined and then coupled to each of two optical nodes, the three downstream RF frequencies will be combined by switching them all to one superposition summation node at the input of a splitter with two outputs and then switching the two outputs of the splitter to coupled them to the appropriate lines coupled to the optical nodes to which the downstreams are to be coupled. Similarly, any downstream can be split and coupled to any number of optical nodes simply by supplying the data which defines the desired number of splits and which downstreams are to be coupled to which optical nodes.

In summary, the function of the US mapper is to take shared upstreams from any number of designated optical nodes which are all the same upstream and mapped to a plurality of downstreams and combine them into one shared upstream for input to a single shared CMTS receiver. This can be done simultaneously for multiple CMTS receivers.

An upstream and downstream manager process in the media access control process can monitor traffic loads and reconfigure the system as needed by adding more downstreams, adding more upstreams mapped to one or more downstreams, combining more shared upstreams to one receiver, or splitting upstreams which have become overloaded to termination by two or more upstream receivers, all as needed to balance the upstream and downstream loads or provide preferences to certain customers. In addition, the upstream and downstream manager, in some embodiments, monitors the upstream receivers and downstream transmitters for failure, and, upon detecting a failure, switches a new receiver or transmitter into the mix as needed to take over the work formerly being done by the failed unit.

As a specific example of how the mappers work, consider the following. The various downstream transmitters 166, 168 and 170 generate separate "coordinated downstreams" on lines 172, 174 and 176, all of which are coupled to the downstream mapper and splitter/combiner 156 (hereafter the DS mapper). Lines 178, 180 and 182 represent electrical lines which carry signals which are converted to optical signals by transducers and coupled by fibers (not shown) to different optical nodes of one or more HFC systems. In alternative embodiments, lines 178, 180 and 182 may be fiber optic data paths to optical nodes 184, 186 and 188, respectively.

The function of DS mapper is to couple certain downstreams to designated optical nodes according to a mapping specified in the control signals on line 162, and to allow easy reconfiguration of the mapping of which downstreams are coupled to which optical nodes by simply changing the control signals on data path 162 without the need to rewire the CMTS. This is done by splitting and/or combining and or switch multiplexing the input radio frequency signals on lines 172, 174 and 176 (DS1, DS2 and DS3, respectively) as needed to connect each RF downstream carrier to the right ones of cables or fibers 178, 180 and 182. Suppose, for example, DS1, DS2 and DS3 are all to share the same upstream receiver 190 via US 1 on data path 200 to receiver 190, but DS1 and DS2 are to be coupled to HFC 1 (data path 178) and DS3 is to be coupled to HFC 3 (data path 182). In this case, DS mapper 156 takes DS1 and DS2 and sums them by superposition at a node coupled to cable or fiber 178. DS1 and DS2 carriers are on different frequencies, so the composite signal comprised of two RF carriers at different frequencies, each bearing the data of a different DOCSIS downstream, is simply coupled from the summing node onto HFC 1. DS3 is simply switched through a multiplexer to HFC 3. If DS3 becomes overloaded with traffic later, another downstream can be added to share the load, and the control signals to the upstream mapper can be changed to connect the new downstream to HFC 2 or HFC 3 if HFC 3 is not overloaded also. Suppose also that a DS4 (not shown) is to be split and transmitted on HFC 3, 4 and 5 (HFC 4 and 5 not shown). In this case, DS mapper 156 switches the RF carrier bearing the DOCSIS downstream data of DS4 to the input of an internal splitter which has four outputs. The four RF outputs of the splitter are coupled, possibly through multiplexers, to the cables or fibers of HFC 3, HFC 4 and HFC 5. All this can be controlled simply by supplying the appropriate control input data on line 90 to the computer or control logic 160. Whatever is supplying the control data on line 190 (usually the DMAC processes) needs to make sure that all the downstreams which share the same upstream are coordinated as that term is defined above.

The upstream mapper and splitter/combiner 158 (hereafter the US mapper) is coupled to all the HFC systems HFC1 through HFC5 at its upstream input side and is coupled to CMTS receivers 190, 192 and 194 via upstream lines 196, 198 and 200, respectively. Although the upstream mapper is shown working in the analog domain before the analog-to-digital conversion that happens in the receiver, the upstream mapping can also occur in the digital domain after the A/D conversion in alternative embodiments. The function of the upstream mapper and splitter/combiner is to provide for flexibility in termination of optical nodes by upstream receivers and easy, electronic switching of the mapping of optical nodes to upstream receivers without the need to rewire the CMTS. The flexible electronically controlled mapping allows multiple optical nodes to be terminated by the same optical receiver, when subscriber penetration is low. Then, as the number of subscribers grows and the traffic volume becomes too much for one upstream receiver to handle, the mapping can be changed to add another receiver and switch some of the optical nodes originally terminated by the first upstream receiver so as to be terminated by the second upstream receiver. Each receiver is considered to be one upstream regardless of how many optical nodes it terminates. Each upstream can be shared by multiple downstreams by the protocol defined above, and the mapping of multiple downstreams to one upstream can be flexibly, electronically changed as new upstreams are added.

In the hypothetical above, suppose DS1 through DS4 are all to share the upstream processed by CMTS receiver 190. In this situation, the upstream RF carriers generated by the CMs which are tuned to DS1 through DS4 are travelling upstream to the CMTS via HFC1 through HFC5 from five different optical nodes. In this situation, the US mapper 158 must combine all the electrical signals on HFC1 through HFC5 and output the result to receiver 190 as shared US1 on line 200.

This combining of the RF carriers on HFC 1 through HFC 5 onto input 200 for receiver 190 can be done in several different ways. They will be described in the separate sections below.

Upstream Combination in TDMA, SCDMA and Mixed Systems by Superposition

Figure 6:
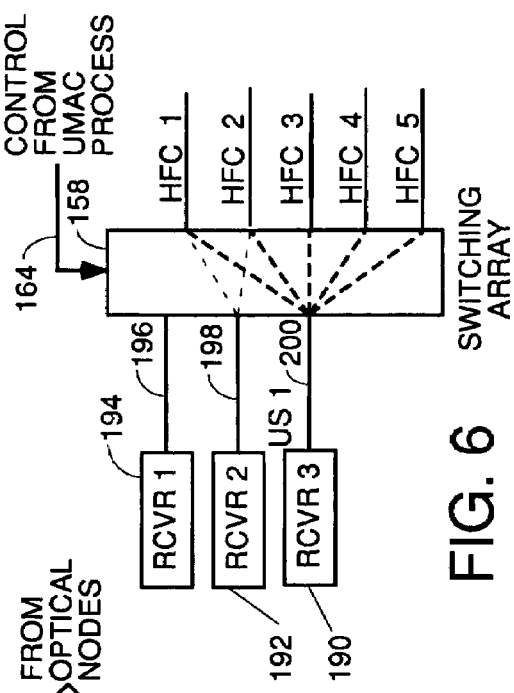
FIG. 6 is a diagram of one embodiment for the upstream mapper and splitter/combiner using a simple switching array that combines upstream RF carriers by summing the signals and superposition.

FIG. 6 is a diagram of one embodiment for the upstream mapper and splitter/combiner 158 using a simple switching array that combines upstream RF carriers by summing the signals and superposition. In this embodiment, a switching array 158 is used in the form of a crossbar switch or other switching array that can couple any number of selected inputs to any number of selected outputs. The switching array's connections are controlled by control signals on line 164 from the UMAC process wherever that process is implemented or by an upstream mapper control process in the physical layer receiver. The signals on line 164 control which of the five inputs from the optical nodes (HFC 1 through HFC 5) are coupled to which of the outputs 200, 198 and 196 coupled to the inputs of upstream receivers 190, 192 and 194. Each of these receivers represents one DOCSIS upstream which can be shared by one or more DOCSIS downstreams. In the example shown, low enough subscriber penetration is assumed as to allow the five optical nodes coupled to HFC 1 through HFC 5 to be terminated in a single upstream receiver 190. In this case, switching array 158 is ordered by signals on control path 164 to continuously connect the HFC 1 through HFC 5 inputs to the input 200 of the shared US1 receiver 190. This is represented by the dashed lines inside the switching array connecting these five inputs to the output 200.

To avoid collisions between bursts, the UMAC process for the shared upstream US1 processed by receiver 190 must schedule bursts on the upstream carriers on HFC 1 through HFC 5 properly to separate them in time on the HFC 1 through HFC 5 inputs for TDMA bursts. SCDMA bursts on the different HFC 1 through HFC 5 inputs do not have to be separated in time. However, the shared US1 upstream UMAC process does have to coordinate the SCDMA burst grants so as to have non overlapping spreading code assignments if they overlap in time, or separate the SCDMA bursts on the different HFC 1 through HFC 5 inputs so as to be separated in time.

FIG. 7 is a diagram of how the UMAC schedules non overlapping TDMA or SCDMA or both TDMA and SCDMA bursts for the upstream transmissions of CMs tuned to one of the multiple downstreams which shares an upstream, with the CMs being coupled to four different optical nodes. Because all the HFC 1 through HFC 5 mediums are continuously connected to the input of receiver 190 in switching array 158, the resulting input to the receiver looks like FIG. 8.

Switching array 158 is preferred for the flexibility it provides in mapping optical nodes to receivers. When the traffic load rises to the point that the receiver 190 cannot process all the bursts, another upstream receiver can be easily added and the switching connections re-mapped to divert the bursts from one or more optical nodes to the second receiver. This is illustrated in FIG. 6 by the dotted lines that couple HFC 1 and HFC 2 to input 198 of receiver 192. This means that the control signal to the switching array are changed such that the switching array breaks the connections between HFC 1 and HFC 2 to input 200 of receiver 190 and makes new connections between HFC 1 and HFC 2 to input 198 of receiver 192. This is done simply by changing the control signals on line 164.

If desired, the mapping of downstreams to upstreams can also be altered when a new upstream receiver is added. How this is done is described in FIG. 9.

The switching matrix 158 with continuous connections aggregates the noise on the various HFC systems which are coupled together to the input of the receiver. In some applications this is permissible. For example, because of the coding gain in the upstream from SCDMA burst traffic, noise aggregation in a system comprised of all SCDMA CMs operating in SCDMA mode might be permissible, especially if all the HFC systems are low noise systems. In some systems there may be some noisy HFC branches and/or a mixed bag of CMs some of which are DOCSIS 1.x TDMA where noise aggregation is a problem. One way to handle this problem even in the presence of noise aggregation is to use the CMTS to monitor the quality of upstream burst reception and create more robust upstream channels and assign CMs that are having problems to these lower throughput, more robust upstream channels. More robust upstream channels mean upstream channels which have lower throughput from lower symbol rate, less complex modulation constellation, and/or higher overhead devoted to forward error correction, etc.

Process to Establish Mapping and Change the Mapping for Load Balancing in the Presence of Noise Aggregation The process the CMTS UMAC and DMAC processes carry out to establish an initial mapping and change it is illustrated in FIG. 9. Step 220 represents the process of the CMTS DMAC processes establishing one or more DOCSIS downstreams and the types of upstreams needed for the CMs in the system. For an all DOCSIS 1.x system, that could be a single downstream and a DOCSIS 1.0 upstream for every optical node. For a system with a mixed bag of DOCSIS 1.0, DOCSIS 1.1 and DOCSIS 2.0 modems, step 220 represents creating at least one downstream for every optical node and a DOCSIS 1.0 and a DOCSIS 2.0 upstream for every optical node that is coupled to both types of CMs. The DMAC processes create the needed downstreams and upstreams in accordance with any process such as by consulting configuration data, interacting with the cable operator, etc. Since the cable operator knows what types of CMs are installed in the system, configuration data can be set up which controls which DMACs establish which type of upstreams are created for each optical node to serve the types of CMs coupled to each optical node.

In step 222, the CMTS downstream transmitters 46 and 48, etc. in FIG. 2 synchronize their timestamp counters to the CMTS master timestamp counter. Downstream transmitters for downstream sharing an upstream upon which SCDMA bursts are allowed synchronize their symbol clocks to at least the phase (using M/N relationship) of a CMTS master clock for the group of downstreams sharing the upstream. The downstreams in each group may also use the same CMTS timestamp counter and/or the same CMTS symbol clock in some embodiments. The CMTS then maps particular downstreams to particular optical nodes and generates suitable control signals to the downstream mapper 156 in FIG. 5 to couple the appropriate downstream transmitter outputs to the appropriate optical nodes in accordance with the mapping. The downstream mapper may be a switch, splitter, combiner or any combination of switches, multiplexer, splitters and combiners necessary to carry out the mapping.

The downstream transmitters then start transmitting the one or more DOCSIS downstreams determined to be required in step 220, and start transmitting SYNC messages in each downstream with timestamp counter samples therein in step 224.

When the CMs coupled to these optical nodes power up, they look for and lock onto a DOCSIS downstream that is most compatible with their modem type and start looking for SYNC, UCD and MAP messages. The CMs receive the SYNC messages and use them to synchronize their local timestamp counters and upstream minislot counters to the timestamp counter to which all the downstream transmitters of downstreams which are sharing an upstream are synchronized. Each CM recovers the CMTS symbol clock from the received downstream signals. The CMs recover the downstream symbol clock and generate an upstream symbol clock having a synchronized M/N frequency relationship to the downstream symbol clock where M and N are integers. This is needed because the symbol clock needed for SCDMA transmission from all CMs in a group of downstreams that share an upstream must be precisely synchronized with the CMTS master clock. In the preferred embodiment, all cable modems (CMs) synchronize their timestamp counters to the timestamp count of the CMTS timestamp counter using the sync message data. In the preferred embodiment, all the CMs tuned to a downstream in a group of downstreams sharing an upstream use the same upstream symbol clock frequency obtained from the CMTS master clock. This is necessary when the upstream allows SCDMA bursts because of the precise upstream synchronization used in SCDMA, and it is desirable for time division multiplexed upstreams also because a shared TDMA upstream also requires fairly precise upstream synchonization to the timeslots although guardbands between timeslots allow a little tolerance.

In step 226, the UMAC for an initial upstream receiver decides which downstreams are to share the upstream receiver, and decides on the channel parameters and burst profile parameters for the shared upstream. The decision as to which downstreams will initially share the same upstream receiver can be made in any way such as by configuration data, initial traffic loading, customer preferences or subscriptions. The UMAC then sends data defining the channel parameters and burst profile for the shared upstream to the DMAC process for each downstream which is to share the upstream via the switch fabric 12. The UMAC for the shared upstream then generates switch control signals for upstream mapper switch 158 in FIG. 6 to couple the HFC systems and optical nodes for all the downstreams which are to share the upstream receiver so as to couple all these HFC systems to the RF input of the receiver to be shared. In the example of FIG. 6, HFC 1 through HFC 5 are all coupled to the input of shared upstream receiver 190. These connections will remain until remapping of the optical nodes to terminate them in one or more additional receivers occurs.

In step 228, the DMAC process for every downstream which is to share the upstream uses the information received from the UMAC process of the shared upstream which defines the channel parameters and burst profile of the shared upstream to generate and transmit downstream UCD messages which define the upstream. These UCD messages are received by the CMs and are used to set the parameters of their upstream transmitters to transmit on the shared upstream with the appropriate burst profile.

In step 230, the CMTS UMAC process for the shared upstream determines an initial station maintenance contention interval during which all CMs that need to do initial training may send their ranging bursts. This MAP data is sent through the CMTS switch 12 or by any other interprocess data transfer mechanism to all the DMAC processes for downstreams which will share the upstream (hereafter referred to as the DMAC group).

In step 232, the DMAC group processes the data into downstream DOCSIS MAP messages and transmits the MAP messages downstream. The MAP messages are coordinated on all downstreams that share the same upstream (hereafter the downstream group) such that the same initial ranging contention interval is defined for all CMs tuned to downstreams in the downstream group. In an alternative embodiment, the DMACs may send messages which schedule individual ranging contention intervals for each upstream channel meaning all downstreams that share that particular upstream must send their initial ranging bursts during the ranging contention interval scheduled for the upstream they share.

The CMs tuned to the downstreams in the downstream group receive the MAP messages and transmit their initial ranging bursts. Each initial ranging burst contains the downstream ID of the downstream to which the CM is tuned, a SID for the CM and the MAC address of the CM.

In step 234, the UMAC of shared upstream and shared receiver receives upstream ranging bursts from CMs tuned to downstreams in the downstream group and processes them in conventional DOCSIS ranging to make offset measurements and develop upstream equalization coefficients and sends ranging response message to each CM from which a ranging burst was successfully received. During the initial ranging bursts (IUC3) and during requests for data (IUC1), the upstream mapper switch will be controlled to sum all cables. This will aggregate noise, but initial ranging bursts are usually QPSK modulated so they have greater noise tolerance.

In step 236, the UMAC of the shared upstream does discovery of which CMs are tuned to each downstream in the downstream group using the downstream IDs, SIDs and/or MAC addresses included in the initial ranging bursts. The UMAC builds a routing table from this information.

In step 238, the UMAC of the shared upstream generates MAP data defining the upstream minislot numbers for station maintenance intervals for "by invitation" additional ranging bursts. After initial ranging bursts, the CMs make the requested adjustments, but not all of them achieve precise synchronization in one try, so additional ranging bursts are invited by the CMTS on a CM-by-CM basis. These station maintenance intervals are intervals defined by the MAP data during which only one particular CM may transmit a ranging burst. This MAP data is sent to the DMAC processes of only downstreams to which are tuned CMs which still need to send more ranging bursts.

In step 240, the conventional DOCSIS ranging process is completed by receiving additional periodic station maintenance ranging bursts from the CMs that have been invited to send more bursts. Offset measurements are made on these bursts and new equalization coefficients are developed. The offsets and equalization coefficients are sent to the CMs that sent the bursts which respond by making appropriate adjustments in their transmitters. Each CM then registers with the CMTS and starts making upstream bandwidth requests.

Step 242 represents an optional step which is implemented in alternative embodiments. With the mapping mechanism illustrated in FIG. 6 (no "per burst switching" as described below to eliminate noise aggregation), noise aggregation occurs. This may cause problems in receiving upstream transmissions from certain CMs such as where the cable plant is noisy and/or the CM is not SCDMA capable and does not have enough power to overcome the noise. In such cases, or in any case when there is noise in the upstream channel, it is desirable to group the CMs in the downstream group that have upstream transmission problems into a different logical group and create a special, lower throughput upstream for them. "Lower throughput upstream" as that term is used herein means an upstream which has a better chance of successful communication upstream even in the face of impairments that make the regular shared upstream not effective for reliable communications. Such a lower throughput upstream may have a lower symbol rate, a less complex modulation constellation and/or more overhead devoted to forward error correction so that fewer payload bits are transmitted per second. More forward error correction means more error detection and correction bits, changes to Reed-Solomon codeword encoding for more powerful error detection and correction capability, using Trellis encoding, or use of other overhead consuming techniques in the burst profile of the upstream to increase the probability of successful upstream communication. Optional step 242 represents the process of:

1) determining which CMs are having problems or would be likely to have problems in the future with reliable upstream communication (or which are overperforming their upstream channels) such as by monitoring and comparing to benchmarks the signal-to-noise ratio, bit error rate, byte error rate, received power or packet loss rate of the initial ranging burst or which optical node the bursts are coming from, etc.;

2) generating data that defines a lower throughput upstream channel (or a higher throughput channel for overperforming CMs) and sending it to the DMACs for downstreams to which are tuned CMs which are having problems (or which are overperforming);

3) using that data in the DMACs of the downstreams to which the CMs having problems (or which are overperforming) are tuned to generate new UCD messages which define the burst parameters of the new lower throughput (or higher throughput) upstream and sending the UCD messages downstream;

4) generating channel change messages in the UMAC of the shared upstream and sending them to the DMACs coupled to the downstreams to which the CMs which are having problems are tuned (or which are overperforming);

5) sending the channel change messages (or ranging response messages which tell the CMs to which they are addressed to change to a new upstream) from the DMACs to the CMs which are having problems to order them to change upstreams (or sending channel change messages or ranging response messages to CMs that are overperforming ordering them to change to a new higher throughput upstream);

6) send switching commands to cause CMTS switch 158 to change connections to couple optical nodes coupled to the CMs having problems (or which are overperforming) to a new upstream receiver (receiver #2), and send burst profile of the new lower throughput (or higher throughput) upstream channel to receiver #2 to configure it properly to receive bursts on the new lower throughput (or higher throughput) channel;

7) when bursts from CMs not having problems but which are coupled to the same optical nodes as the CMs which are having problems (or which are overperforming) are scheduled to arrive at the CMTS, UMAC for the new lower throughput (or higher throughput) upstream sends the burst profile data for the original higher throughput shared upstream to receiver #2 to configure it properly to receive the bursts having the burst profile of the original shared upstream. In alternative embodiments, the new upstream that supports the CMs that are having problems can still be the same receiver as is used by the CMs not having problems, but operating in a different logical channel that has lower modulation complexity and/or more error correction coding; and 8) doing conventional DOCSIS processing to get the CMs which have been moved synchronized with the CMTS on the new upstreams to which they have been moved.

In step 244, the registered CMs start making upstream bandwidth requests during intervals designated by the UMAC of the shared upstream for receiving bandwidth requests.

In step 246, the UMAC receives the bandwidth requests and makes bandwidth grants and sends the grant data for each CM which has received a grant to the DMAC for the downstream to which the CM receiving the grant is tuned. DMACs put grant data in MAP messages and send downstream.

The CMs with the SIDs designated in the MAP message as having a grant respond by sending their upstream data during the minislots designated in the grant.

In step 248, the UMAC process monitors the traffic load on the upstreams and downstreams for load balancing purposes and decides whether or not to add another upstream and/or another downstream and whether to change the mapping between upstreams and downstreams. Monitoring of traffic load can be by any method. For example, the UMAC can keep track of the number of subscribers on the shared upstream. The cable operator may wish to guarantee that no subscriber gets less than 128 kilobits/second whereas each upstream can carry a maximum of 10 megabits/second. Therefore, only 80 CMs can share an upstream, and still guarantee that no subscriber gets less than the minimum throughput. Thus, when the shared upstream UMAC determines that more than 80 CMs have registered on the downstream group sharing an upstream, the UMAC decides to add another upstream and may decide to remap some of the downstreams to the new upstream. More complex load balancing may also be used such as monitoring of channel utilization. For example, the cable operator may set a limit of 60% of the maximum upstream capacity as the decision threshold to add a new upstream. The UMAC for the shared upstream then continuously monitors the aggregated upstream bit rate of all the grants it issues in the MAP messages. The combination of the grants and the burst profile (symbol rate, modulation, etc.) define how much data is being transmitted per second on the shared upstream. When that amount of data exceeds the limit set by the cable operator or some other limit (which may be programmable), the UMAC decides to add another upstream. Alternatively, the UMAC for the shared upstream can calculate the percentage of minislots granted versus the total number of minislots available. In an alternative embodiment, another upstream might be added during business hours to satisfy a subscription for a business client, or another upstream might be added after business hours to handle the increased traffic when people get home from work and go online more on their home CMs. In other embodiments, the CMTS may monitor one or more of the factors identified above (signal-to-noise ration, received power, bit error rate etc.) for the shared upstream and may poll the CMs on each downstream to ask them about the number of transmission errors, signal-to-noise ratio, etc. on their particular downstream to determine whether a new upstream or downstream should be added. Any traffic monitoring or load balancing schemes can be used on the shared upstream and for the downstreams to make the decision as to whether to add a new upstream or downstream and what the burst profile of any new upstream should be.

Step 250 represents the process of deciding based upon any of the factors or methodologies identified above whether to add another upstream. If the decision is to not add another upstream, processing proceeds to step 252 to decide whether to add another downstream.

Whether to add another downstream or not can be made based upon any one or more criteria. The most common are as follows.

1) Using the CMTS routing tables to determine how many CMs are tuned to each downstream and shifting the load if multiple downstreams exist by shifting some CMs over to another downstream so that each downstream serves approximately the same number of CMs.

2) Watching the traffic volume to each CM by examining the destination IP address of incoming packets to be sent downstream and the length in bytes of those packets and mapping the IP destination addresses to the CMs on each downstream. If some CMs are getting heavy downstream traffic, shifting those CMs to another downstream in the group that shares the same upstream (and shifting the upstream also if traffic volume from the CM on the upstream so dictates).

3) Comparing subscription committments as to minimum downstream throughput capacity to one or more CMs and comparing those committments to the amount of traffic on the downstream to which the CM is tuned.

4) If downstream traffic volume is such that the committment might be jeopardized, shifting the CM to another downstream with lighter traffic. One way of making this decision is to compare the downstream traffic volume to a downstream traffic utilization threshold which may be set at some number such as 70% of maximum capacity, etc.

If the decision is to not add another downstream, processing proceeds back to step 248 to monitor traffic conditions or carry out whatever other load balancing scheme is in use.

Figure 9B:
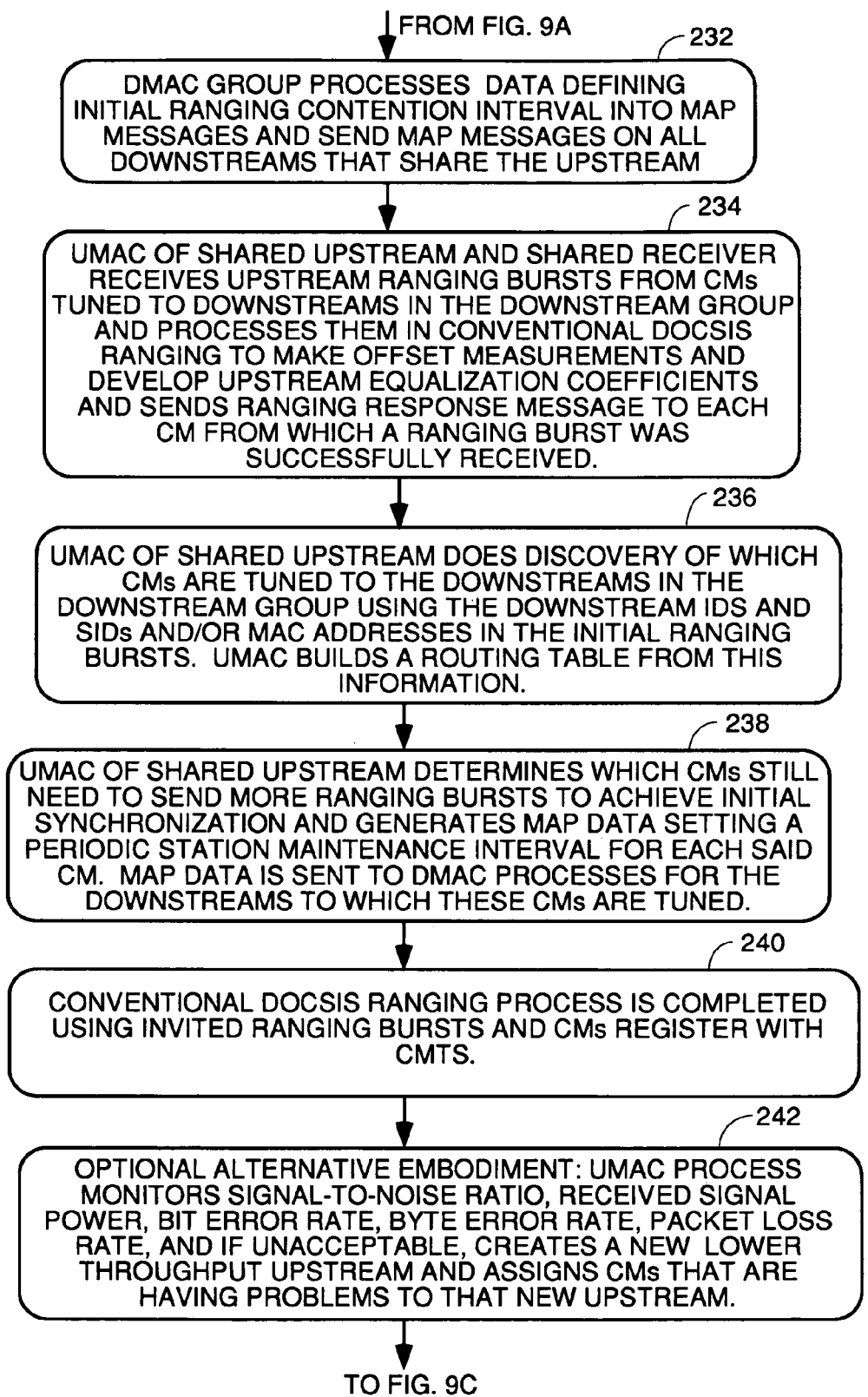
FIG. 9, comprised of FIGS. 9A, 9B and 9C, is a flowchart for flexible mapping of upstreams and downstreams in the presence of noise aggregation with simple switching in of new receivers without changing upstream channel ID, and optional creation of a new upstream channel with a new channel ID and lower symbol rate, less complex modulation, more forward error correction for CMs having upstream communication problems.
Figure 9C:
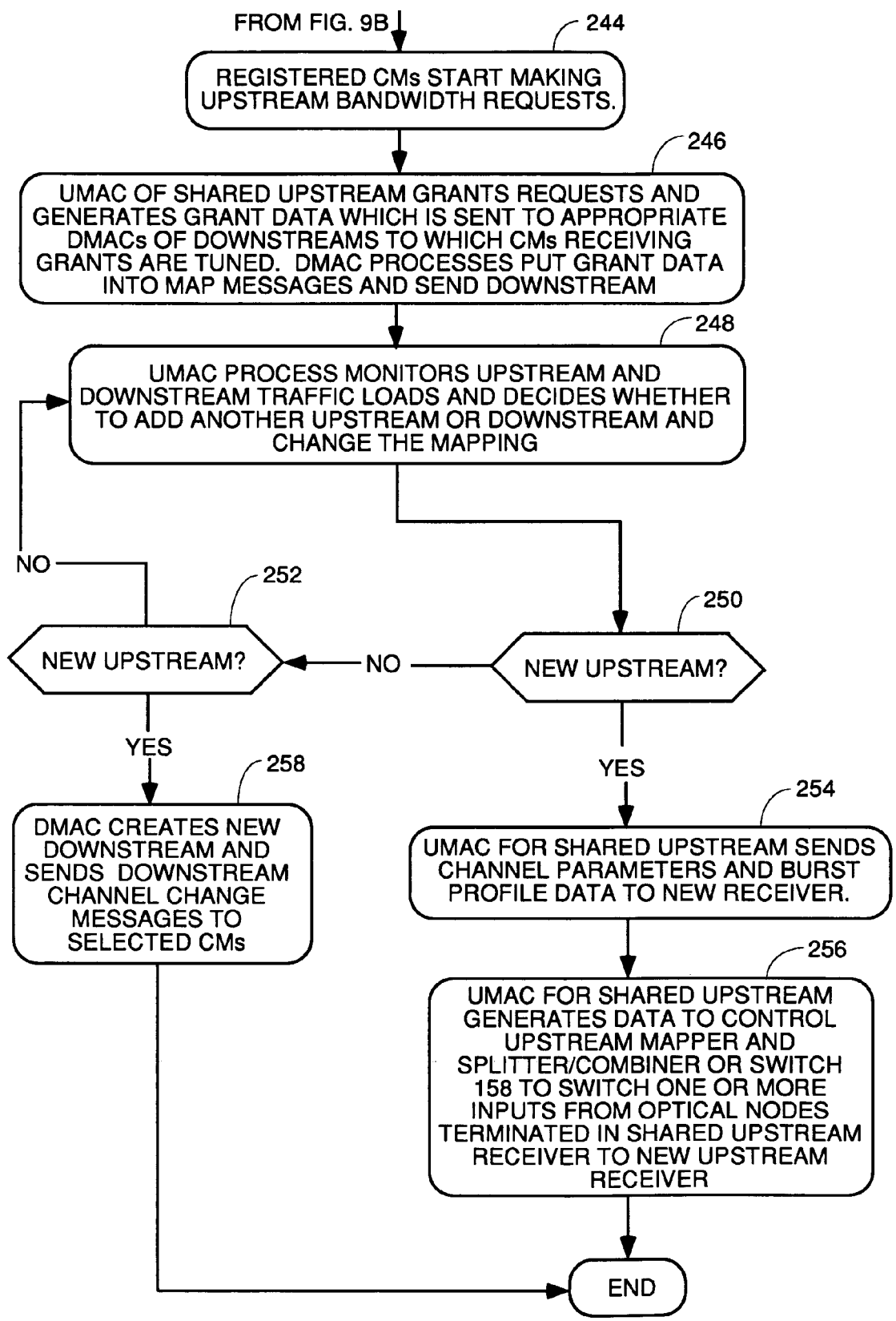

If the process of step 250 decides to add another upstream, step 254 is performed where the UMAC for the shared upstream sends the channel parameters and burst profile data for the existing shared upstream to the new receiver to ready it to receive bursts. In this embodiment of FIGS. 9A through 9C, a new upstream ID is not actually being created with a new or even the same burst profile. The embodiment of FIGS. 10A through 10C is an embodiment where an entirely new upstream with its own upstream channel ID is created. This new upstream in the embodiment of FIGS. 10A through 10C may have different channel and burst parameters as the original upstream or it may have the same channel and burst parameters. In the embodiment of FIGS. 9A through 9C, no new upstream is created. Only a new receiver is added to the existing upstream is added which is configured to handle the same type bursts as are being transmitted on the original shared upstream is being added. Bursts can be switched so that one receiver handles one burst and the other receiver handles the next burst.

In the embodiment of FIGS. 10A through 10C, an entirely new upstream ID is created. To do this, a UMAC for the new upstream will generate data for a new UCD message which defines the new upstream for the CMs. This data will be sent to the DMAC processes for the CMs that are to be switched to the new upstream, and a UCD message will be composed and sent downstream. The CMs that are to be switched to the new upstream ID are then sent upstream channel change messages. They respond by listening for the UCD message for the new upstream, and use the data therein to configure their transmitters to transmit on the new upstream.

The channel parameters and burst profile attributes of the new upstream may be the same as the original shared upstream or they may be different. For example, continual monitoring of signal-to-noise ratio, bit error rate, packet loss rate, etc. may lead to the conclusion that some CMs are having problems with upstream communications or are over-performing their upstreams. These CMs can be grouped into a separate logical group and a lower throughput or higher throughput upstream created for them, as the case may be.

This can be done as an ongoing monitoring process in addition to the optional step previously described of monitoring the initial training bursts for SNR, bit error rate etc. and creating lower throughput upstream channels initially for some CMs during the initial training.

Then step 256 is performed by the UMAC of the shared upstream to generate new switching signals to control the upstream mapper and splitter/combiner or switch 158 in FIG. 6 to switch some of the inputs from HFC 1 through 5 over to the input of the new receiver (192 in FIG. 6). Typically no re-ranging is necessary since the channel parameters did not change and the data path did not change significantly in length. If re-ranging is needed, it can be done in the conventional DOCSIS fashion after an upstream channel change message.

The process then ends, but in alternative embodiments, continual monitoring for traffic conditions occurs so processing returns to step 248, as represented by line 257.

If step 252 decides to create a new downstream, step 258 is performed. Step 258 creates the new downstream in a normal DOCSIS fashion, and DOCSIS Dynamic Channel Change-Request (DCC-REQ) messages are then sent to each CM to be changed to the new downstream. The DCC-REQ message also specifies the ID of the upstream channel the CM should use once it gets synchronized to the new downstream. The DCC-REQ message also includes the frequency, modulation type, symbol rate, interleaver depth and downstream channel ID of the new downstream and a copy of the UCD message for the upstream to be used. The DCC-REQ message also informs the CM whether it needs to wait for a new SNYC message on the new downstream and re-synchronize its counters before transmitting upstream. If the CMTS has synchronized the timestamps between the old downstream and new downstream (timestamps derived from the same clock), the CMTS may tell the CM not to wait for a new SYNC message. The DCC-REQ message also tells the CM what level of re-initialization to perform. Generally, if the move within the same MAC domain, complete re-initialization is usually not needed although some re-ranging might be necessary. The CMs to be switched receive these DCC-REQ messages and switch to the new downstream and get re-synchronized in the conventional DOCSIS way and sets up its transmitter using the data in the UCD message copy in the DCC-REQ message.

Referring to FIG. 10, comprised of FIGS. 10A, 10B, 10C and 10D, there is shown a flowchart for a process for flexible mapping of upstreams and downstreams in the presence of noise aggregation with monitoring for problems and load balancing issues and creation of new upstreams or downstreams to resolve those issues. In this process, the steps that have the same step numbers as steps in FIG. 9 are the same as in FIGS. 9A through 9C, and their explanation will not be repeated here. A first difference over the FIG. 9 process is in step 242 which was optional in FIG. 9 but is performed in FIG. 10. Step 242 comprises the following steps:

1) determining which CMs are having problems with reliable upstream communication or which are overperforming their channels on the basis of signal-to-noise ratio, bit error rate, byte error rate, packet loss rate, etc.

2) generating UCD data that defines a lower throughput upstream channel (lower symbol rate, less complex modulation constellation, more aggressive forward error correction parameters) or a new higher throughput upstream channel (higher symbol rate, less error correction bits, more complex modulation constellation, etc.) and sending it to the DMACs for downstreams to which are tuned CMs which are having problems or which are overperforming, 3) using that UCD data in the DMACs of the downstreams to which the CMs having problems or which are overperforming are tuned to generate new UCD messages which define the burst parameters of the new lower throughput or higher throughput upstream and sending the UCD messages downstream, 4) generating channel change messages in the UMAC of the shared upstream and sending them to the DMACs coupled to the downstreams to which the CMs which are having problems or which are overperforming are tuned, 5) sending Dynamic Channel Change (DCC-REQ) or Upstream Channel Change (UCC-REQ) or ranging response messages from the DMACs to the CMs which are having problems or which are overperforming to order them to change to the lower throughput and/or a new higher throughput upstream (both new lower throughput and higher throughput upstreams are created if some CMs are having problems and some are overperforming), 6) sending switching commands to cause CMTS switch 158 to change connections to couple optical nodes coupled to the CMs having problems and/or which are overperforming to one or more new upstream receivers (receiver #2 and/or receiver #2 for the lower throughput upstream and receiver #3 for the higher throughput upstream), and send burst profile of the new lower throughput and/or new higher throughput upstream channel to receiver #2 and/or receiver #3 to configure them properly to receive bursts on the new lower throughput channel and/or new higher throughput upstream channel, 7) when bursts from CMs not having problems but which are coupled to the same optical nodes as the CMs which are having problems or which are overperforming are scheduled to arrive at the CMTS, UMAC for the new lower throughput upstream and/or new higher throughput upstream channel sends the burst profile data for the original shared upstream to receiver #2 or receiver #3 to configure it properly to receive the bursts having the burst profile of the original shared upstream or just switches those bursts to the input of receiver #1 which is configured to receive bursts having the burst profile and channel parameters of the original shared upstream, and 8) doing conventional DOCSIS processing to get the CMs which have been moved synchronized with the CMTS on the new upstreams to which they have been moved.

In alternative versions of this species, the upstream mapper and splitter/combiner 158 in FIG. 5 can be a simple summing node to which the inputs of the two and/or three receivers are coupled. A first receiver is configured with the channel and burst parameters of the original shared upstream channel, a second receiver is configured with the lower throughput channel channel and burst parameters, and a third receiver (if present) is configured with the channel and burst parameters for the new higher throughput upstream. Each upstream may simply be a different logical channel on the same physical channel (frequency) such as by putting three logical channels in different time intervals of the same upstream physical channel (RF carrier) and separated by null SIDs. Each receiver receives all bursts, but ignores the bursts which it is not configured to process.

In another alternative embodiment, the upstream mapper and splitter/combiner 158 in FIG. 5 is an actively managed switch which switches all bursts having the burst profile for the lower throughput channel to the input of the receiver configured with the lower throughput channel's channel and burst parameters. All bursts having a burst profile for the original shared upstream are routed to the input of the receiver configured to process them. The UMAC processes of the shared upstream and the new upstream schedule each burst and know when they will arrive from each optical node based upon their MAP data and routing tables and suitably cooperate to manage the switching action of the upstream mapper 158 to get the right burst to the right receiver.

The next change is at step 260 on FIG. 10C. In the embodiment of FIG. 10, an entirely new upstream ID is created when it is decided to add another upstream either because of load balancing or communication problem considerations. To do this, the UMAC for the shared upstream generates data to define the channel parameters and burst profile for the new upstream channel (or new upstream logical channel) to be created and sends this data to the DMACs of any downstream in the downstream group to which a CM to be changed is tuned, as represented by step 260. In step 262, the DMAC processes uses this data to create a new UCD message for the new upstream and send the new UCD message downstream. This new UCD message defines the channel and burst profile parameters of the new upstream for the CMs to be switched to the new upstream. The CMs that are to be switched to the new upstream ID are then sent Upstream Channel Change (DOCSIS UCC-REQ) or ranging response messages in step 264 which instruct these CMs to change to the new upstream. They respond by listening for the UCD message for the new upstream, and use the data therein to configure their transmitters to transmit on the new upstream. Step 264 also represents the process of generating suitable switch control signals for the upstream mapper to change the mapping of optical nodes to upstream receiver line cards if necessary.

The channel parameters and burst profile attributes of the new upstream may be the same as the original shared upstream or they may be different. For example, increased traffic causing capacity of the shared upstream to be strained may result in another upstream with the same burst profile parameters but a different frequency to be created and certain CMs shifted over to the new upstream. Which CMs are shifted can be decided in any of several ways: purely on the basis of numbers of CMs on each upstream; on the basis of bandwidth being consumed in the shared upstream by each CM based upon the grants in the maps such as number of minislots awarded to any particular CM over an interval compared to the total number of minislots during that interval; or based upon guaranteed subscription committments to various CMs compared to the traffic levels on the upstream being used by the CMs having these committments.

Likewise, the need for a new upstream may be based upon communication difficulties being experienced by some modems, especially DOCSIS 1.0 or 1.1 modems in a system dominated by DOCSIS 2.0 modems. The UMAC of the shared upstream, in some embodiments, carries out continual monitoring of signal-to-noise ratio, received signal power, bit error rate, byte error rate, packet loss rate, etc. This monitoring may lead to the conclusion that some CMs are having problems with having reliable upstream communications. These problem CMs can be grouped into a separate logical group and a lower throughput upstream (lower symbol rate, less complex modulation constellation, more overhead devoted to forward error correction) created for them. Then appropriate UCD and upstream channel change messages are sent to the problem CMs to cause them to switch to the new lower throughput upstream. This can be done as an ongoing monitoring process in addition to the step 242 previously described of monitoring the initial training bursts for SNR, bit error rate etc. and creating lower throughput upstream channels initially for some CMs during the initial training.

Step 266 represents the process of re-initializing the CMs which have been switched to the new upstream ID in the way defined in the DOCSIS specifications. This same process is performed to re-initialize any CMs that have been switched to a new downstream after step 258 is performed to create new downstreams and shift some CMs to the new downstream. Processing then continues back to step 248 to continue the monitoring process for load balancing or communication problem resolution.

FIG. 11, comprised of FIGS. 11A, 11B, 11C, is a flowchart of the preferred species within the process genus of the invention for providing flexible mapping of upstream receivers to optical nodes without aggregating noise. The species of FIG. 11 also provides flexible mapping of one or more downstreams to each upstream. The process steps having the same reference numbers as steps in the processes of FIGS. 9 and 10 work the same way and will not be described again here. The discussion of these steps for the species of FIGS. 9 and 10 is hereby incorporated by reference. Only the differences will be described here.

The main difference between the species of FIG. 11 and the species of FIGS. 9 and 10 is that the UMAC process for the shared upstream controls switching of the upstream mapper switch 158 in FIG. 6 such that the shared upstream receiver is only coupled to a particular optical node when a burst is expected to arrive from that optical node and is disconnected at all other times. This prevents noise aggregation. This requires the UMAC process to check its MAP data and routing table so as to know when TDMA bursts will be arriving from various optical nodes and it requires the UMAC to generate the MAP so as to group SCDMA bursts from the various CMs such that SCMDA bursts from CMs coupled to the same optical node are all grouped into the same interval of upstream minislots during which the mapper switch 158 is operated to couple the receiver to that particular optical node. Changes to the mapping provided by switch 158 will be done at MAP message boundaries in time.

The first change over the process of FIG. 10 is at step 242. This step is optional in the process of FIG. 11, but is included in an alternative embodiment of the species of FIG. 11. Step 242 represents the process of monitoring signal-to-noise ratio (SNR) or received power (or bit error rate or byte error rate or packet loss rate) during the initial training burst reception from each CM and determining whether any CM, after multiple attempts to successfully complete initial ranging, is still suffering from a bad SNR or received power which is too low. This can happen in noisy or lossy HFC systems which are found in Japan and other places in the orient frequently. If one or more CMs are not able to successfully complete initial ranging with adequate SNR or received power or both, step 242 sets up a special lower throughput upstream channel for these CMs. This special upstream may have a lower symbol rate, less complex modulation constellation, more aggressive forward error correction settings in its burst profile so as to insure successful upstream communications even if a CM suffers from inadequate received power or bad SNR. Step 242 is made optional in FIG. 11 since the process of FIG. 11 does not aggregate noise and step 242 may not be needed unless the HFC system is very noisy or lossy. In such a case, the invention of FIG. 11 will be practiced in its alternative embodiment with step 242 being carried out. The steps to set up the lower throughput channel in this alternative embodiment are:

1) determining which CMs are having problems with reliable upstream communication such as by monitoring signal-to-noise ratio, bit error rate, byte error rate, received power, packet loss rate, which optical node the bursts are coming from etc.,
2) generating data that defines a lower throughput upstream channel and sending it to the DMACs for downstreams to which are tuned CMs which are having problems,
3) using that data in the DMACs of the downstreams to which the CMs having problems are tuned to generate new UCD messages which define the burst parameters of the new lower throughput upstream and sending the UCD messages downstream, 4) generating channel change messages in the UMAC of the shared upstream and sending them to the DMACs coupled to the downstreams to which the CMs which are having problems are tuned, 5) sending the channel change messages from the DMACs to the CMs which are having problems to order them to change upstreams, 6) send switching commands to cause CMTS switch 158 to change connections to couple optical nodes coupled to the CMs having problems to a new upstream receiver (receiver #2), and send burst profile of the new lower throughput upstream channel to receiver #2 to configure it properly to receive bursts on the new lower throughput channel, 7) when bursts from CMs not having problems but which are coupled to the same optical nodes as the CMs which are having problems are scheduled to arrive at the CMTS, UMAC for the new lower throughput upstream sends the burst profile data for the original higher throughput shared upstream to receiver #2 to configure it properly to receive the bursts having the burst profile of the original shared upstream, and 8) doing conventional DOCSIS processing to get the CMs which have been moved synchronized with the CMTS on the new upstreams to which they have been moved.

The next major change over the embodiments of FIGS. 10 and 9 is in controlling the upstream mapper switch 158. In step 226, as was the case for the species of FIGS. 9 and 10, the UMAC for the shared upstream generates switch control signals for upstream mapper switch 158 in FIG. 6 to couple the HFC systems and optical nodes for all the downstreams which are to share the upstream receiver so as to couple all these HFC systems to the RF input of the receiver to be shared. In the example of FIG. 6, HFC 1 through HFC 5 are all coupled to the input of shared upstream receiver 190. These connections will remain during the initial ranging process only because the initial ranging process is a contention interval and the UMAC does not know when ranging bursts will arrive. However, after the CMs Initial Maintenance Bursts (IUC3 bursts) are received, the upstream mapper switch 158 will be operated to avoid aggregation of noise except during any contention intervals set by the UMAC of the shared upstream during which any CM may request upstream bandwidth. Since the UMAC does not know when these bursts from various CMs will arrive but does know when the contention interval for upstream requests is, it will control the upstream mapper 158 to connect all HFC systems and optical nodes coupled to the downstream group to couple them to the input of the shared upstream receiver. Although the noise will be aggregated during the contention intervals, contention grants for bandwidth requests are for robust QPSK modulation which can be successfully received in the presence of higher noise.

Controlling of the upstream mapper switch 158 to avoid aggregation of noise starts in step 245 which replaces step 246 of the species of FIGS. 9 and 10. In step 245, the UMAC of the shared upstream receives the upstream bandwidth requests from the CMs and grants them but the granting process is coordinated such that TDMA bursts from CMs tuned to the downstream group but on different optical nodes are coordinated so as to not overlap in time. Likewise, SCDMA grants are coordinated by the UMAC process such that all CMs coupled to each optical node have their SCMDA burst grants grouped together into the same interval dedicated to that optical node. The intervals dedicated for SCDMA bursts for each optical node are coordinated by the UMAC process so as to not overlap. This allows the upstream mapper switch 158 to be controlled so that each TDMA burst from a CM and each group of SCDMA bursts will be expected and the HFC on which the TDMA burst or group of SCDMA bursts is arriving will connected to the RF input of the shared receiver just in time to receive and process the burst or bursts, and disconnected thereafter. In other words, the upstream mapper switch is operated to couple each HFC to the input of the receiver just during the time when a TDMA burst or group of SCDMA bursts from the same optical node are arriving and not thereafter. Step 245 represents the process of granting the upstream bandwidth requests and grouping them as described above and sending the grant data to the appropriate DMAC processes for incorporation into MAP messages for sending downstream.

Step 247 represents the process carried out by the UMAC of the shared upstream of examining the grant data and its upstream minislot counter to determine when upstream TDMA or groups of SCDMA bursts are expected from various CMs and examining the routing table to determine which optical node each burst or group of bursts will be coming from. Suitable switching commands are then generated and sent to the upstream mapper switch to control it to connect each HFC to the input of the shared receiver just during the time of arrival of a TDMA burst or group of SCDMA bursts and to disconnect the HFC from the receiver input thereafter. This prevents noise aggregation.

Figure 12:
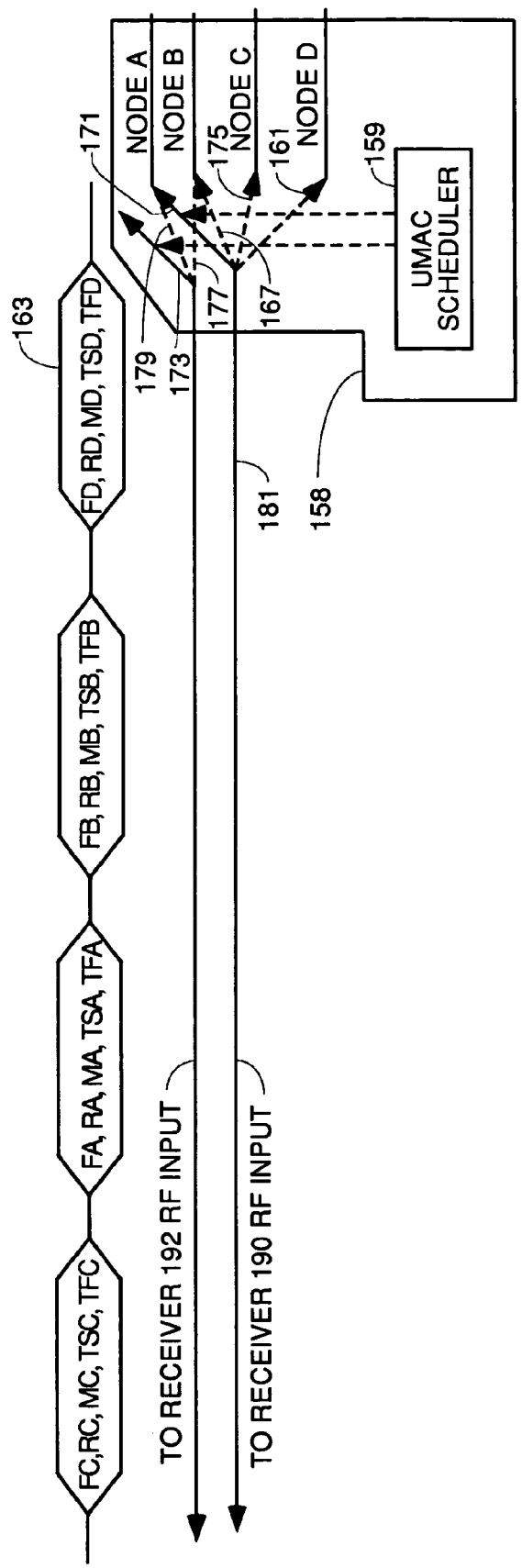
FIG. 12 is an illustration of how a scheduler process 159 in the UMAC process of the shared upstream controls one or more switches in the upstream mapper switch 158 to couple different optical nodes to different upstream receiver RF inputs at different times to prevent noise aggregation.

This operation of the upstream mapper switch 158 is illustrated in FIG. 12. FIG. 12 is an illustration of how a scheduler process 159 in the UMAC process of the shared upstream controls one or more switches in the upstream mapper switch 158 to couple different optical nodes to different upstream receiver RF inputs at different times to prevent noise aggregation. For example, suppose that TDMA bursts or groups of SCDMA bursts, or both, are scheduled in the MAP data to arrive at the CMTS in the time sequence illustrated in FIG. 7 with time increasing from right to left in the figure and that only a single shared upstream processed by receiver 190 in FIG. 6 is to be used. In this case, scheduler 159 controls upstream mapper 158 to make the connection represented by dashed line 161 in FIG. 12 from node D to the input of receiver 190 during the time burst 163 is arriving. At the end of burst 163, connection 161 is broken. Next, collection of SCDMA bursts 165 is scheduled to arrive from optical node B. Schedule 159 controls switch 158 to make the connection represented by dashed line 167 during the interval when the collection of bursts 165 are to arrive and to break the connection 167 after the collection of SCDMA bursts 165 end. Next, TDMA burst 169 is scheduled to arrive on node A. The scheduler controls the switch 158 to make the connection 171 during the time burst 169 is arriving and breaks the connection after burst 169 ends. Finally, burst 173 is scheduled to arrive from optical node C. The scheduler responds by controlling switch 158 to make the connection represented by dashed line 175 during the time burst 173 is arriving and breaks the connection thereafter.

Step 248 in FIG. 11 is the same as in the processes of FIGS. 9 and 10 and represents the process of monitoring upstream and downstream communications for load balancing issues at least and for both load balancing and communications problems in some preferred embodiments. Tests 250 and 252 represent the process of deciding based upon the monitoring whether to add another upstream and/or another downstream. If a decision is made to add another upstream, step 251 is performed to determine if the new upstream needs to have different channel parameters and a different burst profile and a different channel ID than the existing shared upstream.

Adding another upstream receiver can be done in either of two ways. If the burst does not have to have different channel parameters and burst profile (because no CM is having communication problems and load balancing is the only issue), the easiest way is to not create a new upstream channel ID and simply route some of the bursts to the RF input of another receiver by suitably controlling upstream mapper switch 158. This is the process represented by step 253. In step 253, no new upstream channel ID with different channel and burst parameters is created. Instead, some of the bursts on the existing shared upstream are diverted to a second receiver by suitably controlling upstream mapper switch 158. Thus, for example, in FIG. 7, a decision may be made that too many subscribers are being processed by receiver 190 so a second receiver 192 is to be added to process some of the bursts on the shared upstream such as all bursts from CMs coupled to optical nodes A and B. In this example, step 253 represents the process of controlling a switch 173 in upstream mapper 158 in FIG. 12 to make the appropriate connections at the appropriate times. Specifically, switch 173 will be controlled by scheduler 159 to make the connection represented by dashed line 177 to connect node B to the RF input of receiver 192 during the time when burst 165 in FIG. 7 is arriving. Switch 173 will be controlled by scheduler 159 to make the connection represented by dashed line 179 to connect node A to the RF input of receiver 192 during the time burst 169 is arriving. In the meantime, the switch 181 coupled to the input of receiver 190 will be controlled by scheduler 159 to connect receiver 190 to node D when burst 163 is arriving and to node C when burst 173 is arriving. Thus, the bursts are split between two receivers to share the load.

If step 251 decides that a new upstream channel ID with different channel and/or burst parameters is needed, test 255 is performed to determine if there is also a need to create a new downstream. This decision can be made by any of the methods previously described such as monitoring the number of subscribers being served by the downstream group, monitoring the amount of IP packets sent to CMs one each downstream or to particular CMs, comparing traffic to one CM to the traffic to other CMs on the same downstream and the guaranteed capacity promised to the first CM, etc.

If step 255 decides that a new downstream needs to be created, step 261 is performed where the DMAC creates a new downstream in conventional DOCSIS fashion and sends a downstream channel change message to each CM to be changed to the new downstream. The downstream channel change message tells the CMs which have been changed to the new downstream which upstream to use so remapping of downstreams to a shared upstream is done at this point. Step 261 also represents the process of generating new switch control signals for the downstream mapper 156 in FIG. 5 to change the mapping of transmitter outputs to optical nodes if necessary. The CMs tune to the new downstream and do all the other processing necessary to get into synchronization with the CMTS, as represented by step 259. In other words, step 259 is performed to re-initialize the CMs on the new downstream, if necessary, according to standard DOCSIS processing.

If step 255 decides there is no new downstream needed or after step 259 is performed, step 260 is performed. This step is as previously described and creates the channel and burst parameter data for the new upstream channel ID and sends it to the DMACs in the downstream group. All other processing steps are as previously described to generate and send new UCD messages, switch selected CMs to the new upstream, re-initialize any switched CMs if necessary, and continuing to monitor load balance and communication parameters for further upstream and downstream creation if necessary.

The upstream mapper 158 in FIG. 158 can take many different forms consistent with the teachings herein. For example, it can a plurality of multiplexers, each having multiple inputs coupled to the HFC systems and a single output coupled to the RF input of a DOCSIS upstream receiver, or it can be a simple combiner for each receiver to combine RF signals from multiple HFC systems to one composite RF signal, and coupled to the RF input thereof with switches capable of coupling one or more HFC systems to each combiner. The switching can also be done in the digital domain after the analog-to-digital conversions. Any combination of switches, multiplexers, combiners and splitters can be used. When combiners or splitters are used, it is possible in some embodiments to program one receiver to receive bursts having a first burst profile and to program a second receiver to receive bursts having a second burst profile and to supply bursts of both profiles to the input of each receiver. Each receiver then processes only the bursts having the profile which the receiver has been configured to process and ignores all other bursts.

It is also possible to have two different upstreams in different logical channels during different time intervals on the same physical channel which is coupled to the input of a single receiver. The single receiver then has the proper channel and burst parameters supplied to it by the UMAC processes at the proper times to receive the bursts in each logical channel.

The same considerations apply to downstream mapper and splitter/combiner 156 In short, the structure of the upstream and downstream mappers is not critical, and anything that will work to allow electronic, flexible mapping of downstreams to shared upstreams and changing of the mapping and which allows different optical nodes to be flexibly mapped to different upstream receivers and the addition of additional upstreams and downstreams one at a time with flexible, electronic re-mapping of downstreams to upstreams and optical nodes to upstream receivers will suffice to practice the invention.

In an alternative embodiment, port trunking where multiple upstreams are used to transmit data from the same cable modem is also possible to allow a cable modem to have a large bandwidth upstream where needed. Port trunking in the DOCSIS area is disclosed in U.S. patent application Ser. No. 10/446,511, filed May 28, 2003 and entitled WIDEBAND DOCSIS ON CATV SYSTEMS USING PORT TRUNKING, which is hereby incorporated by reference.

Although the invention has been disclosed in terms of the preferred and alternative embodiments disclosed herein, those skilled in the art will appreciate possible alternative embodiments and other modifications to the teachings disclosed herein which do not depart from the spirit and scope of the invention. All such alternative embodiments and other modifications are intended to be included within the scope of the claims appended hereto.

What is claimed is:

1. A subsystem for a cable modem termination apparatus to allow flexible upstream and downstream mapping, comprising:

a downstream mapper having one or more inputs for coupling to DOCSIS downstream transmitters, and one or more outputs for coupling to hybrid fiber coaxial cable systems, and having a control input;

an upstream mapper having one or more inputs for coupling to hybrid fiber coaxial cable systems and having one or more outputs for coupling to inputs of one or more DOCSIS upstream receivers, and having a control input;

a control circuit coupled to said control inputs for generating signals which control which transmitters are coupled to which optical nodes and which optical nodes are coupled to which receivers, wherein said control circuit is a computer programmed with at least one upstream media access control process (UMAC) and a downstream media access control process (DMAC) for each DOCSIS downstream generated by one of said transmitters, and wherein said computer is programmed by said UMAC and DMAC processes to exchange data between said UMAC process and said DMAC processes to allow a flexible number of downstreams share the same upstream receiver.

2. A subsystem for a cable modem termination apparatus to allow flexible upstream and downstream mapping, comprising:

a downstream mapper having one or more inputs for coupling to DOCSIS downstream transmitters, and one or more outputs for coupling to hybrid fiber coaxial cable systems, and having a control input;

an upstream mapper having one or more inputs for coupling to hybrid fiber coaxial cable systems and having one or more outputs for coupling to inputs of one or more DOCSIS upstream receivers, and having a control input;

a control circuit coupled to said control inputs for generating signals which control which transmitters are coupled to which optical nodes and which optical nodes are coupled to which receivers;

a cable modem termination system comprising:
  a storage/cache circuit;
  one or more downstream transmitter line cards, each having a DOCSI~downstream transmitter thereon which is coupled to said downstream mapper;
  a timestamp counter means coupled to said transmitter line cards for providing synchronized timestamp counts to all transmitter line cards which are sharing an upstream receiver line card;
  one or more upstream receiver line cards, each having a DOCSIS upstream receiver thereon having an radio frequency input coupled to said upstream mapper;
  a forwarder/application server;
  a packet switch having one or more ports for coupling to a wide area network, one or more ports for coupling to one or more local content servers, one or more ports coupled to said storage/cache circuit, one or more ports coupled to said transmitter line cards, one or more ports coupled to said receiver line cards, one or more ports coupled to said forwarder/application server;
  and wherein each said receiver is a separate line card which has a computer therein programmed with an upstream media access control process (UMAC);
  and each said transmitter is a separate line card having a computer therein programmed to execute a downstream media access control process (DMAC) for a DOCSIS downstream generated by said transmitter;
  and wherein at least one of said receivers represents a shared upstream receiver shared by a plurality of downstreams;
  and wherein said computers in said line cards are programmed by said UMAC process of said shared upstream receiver and said DMAC processes of said transmitters which share said shared upstream receiver to exchange data between said UMAC process and said DMAC processes via said packet switch to allow a flexible number of downstreams to share the same upstream receiver.

3. A subsystem for a cable modem termination apparatus to allow flexible upstream and downstream mapping, comprising:

a downstream mapper having one or more inputs for coupling to DOCSIS downstream transmitters, and one or more outputs for coupling to hybrid fiber coaxial cable systems, and having a control input;

an upstream mapper having one or more inputs for coupling to hybrid fiber coaxial cable systems and having one or more outputs for coupling to inputs of one or more DOCSIS upstream receivers, and having a control input;

a control circuit coupled to said control inputs for generating signals which control which transmitters are coupled to which optical nodes and which optical nodes are coupled to which receivers, wherein said UMAC process monitors traffic load conditions and/or communication difficulties of cable modems tuned to downstreams that are sharing the upstream receiver on the line card which is executing said UMAC process and which are coupled to optical nodes in the HFC system, and decides if another upstream needs to be added having a lower throughput for cable modems that are having difficulty communicating upstream, and/or decides if the mapping of optical nodes to receiver line cards needs to be changed for load balancing purposes, and wherein said computer programmed with said UMAC process executing on the receiver line card which is being shared by a group of downstream transmitter lines cards then cooperates with the DMAC processes in the group of downstream transmitter line cards which are sharing the same upstream receiver to send any messages needed to create a new upstream and controls said upstream mapper to alter a mapping of optical nodes to upstream receivers to carry out load balancing or guide signals of a new lower throughput upstream to a different upstream receiver.

4. A subsystem for a cable modem termination apparatus to allow flexible upstream and downstream mapping, comprising:

a downstream mapper means having inputs for coupling to the outputs of a plurality of DOCSIS transmitters of a cable modem termination system and having outputs for coupling to a plurality of optical nodes of a hybrid fiber coaxial cable system, and having a control input, for flexibly mapping signal paths from the outputs of each of said one or more said transmitters to one or more of said optical nodes in accordance with switching control signals received at said control input;

an upstream mapper means having a plurality of inputs for coupling to a plurality of optical nodes of a hybrid fiber coaxial cable system, and having one or more outputs for coupling to the radio frequency inputs of one or more DOCSIS upstream receivers, and having a control input, for flexibly mapping signal paths from said one or more optical nodes to one or more radio frequency inputs of said one or more DOCSIS upstream receivers in accordance with switching control signals received at said control input; and one or more computer means coupled to said control inputs of said downstream mapper means and said upstream mapper means, said computer means for generating said switching control signals for each of said downstream and upstream mapper means to implement a desired mapping of DOCSIS downstreams generated by said transmitters to said optical nodes and a desired mapping of signals from said one or more optical nodes to the radio frequency inputs of said one or more DOCSIS upstream receivers and to be able to alter said mappings easily by changing said switching control signals.

5. The subsystem of claim 4 farther comprising a cable modem termination means having one or more downstream transmitter line cards each containing a DOCSIS transmitter having an output coupled to said downstream mapper means, and a timestamp counter means for supplying synchronized timestamp counts to every downstream transmitter line card in a group of downstreams which will share an upstream, and having one or more upstream receiver line cards each having a DOCSIS upstream receiver having a radio frequency input coupled to said upstream mapper mean, said cable modem termination means including a switch fabric means for routing packets between said line cards, a storage/cache circuit, a forwarder/application circuit and ports for coupling to a wide area network and local content servers, said cable modem termination means for sewing as the headend of a hybrid fiber coaxial cable system coupled via one or more optical nodes to a plurality of cable modems and for:
1) creating DOC SIS downstreams and upstreams;
2) implementing a flexible mapping between said downstreams and said optical nodes;
3) mapping one or more downstreams to a shared upstream receiver and generating and sending suitable downstream DOCSIS messages to implement said mapping;
4) implementing a flexible mapping of optical nodes to upstream receivers;
5) carrying out load balancing and communication parameter monitoring so as to create new upstreams and downstreams with channel parameters and burst profiles as needed to meet load balancing considerations or resolve problems some cable modems may be having in communicating with said cable modem termination means.

6. The subsystem of claim 4 further comprising a cable modem termination system having one or more downstream transmitter line cards each containing a DOCSIS transmitter having an output coupled to said downstream mapper means, and a timestamp counter means for supplying synchronized timestamp counts to every downstream transmitter line card in a group of downstreams which will share an upstream, and wherein each downstream transmitter line card includes a computer or state machine programmed or structured to implement a downstream media access control (DMAC) process, and having one or more upstream receiver line cards each having a DOCSIS upstream receiver having a radio frequency input coupled to said upstream mapper mean, and wherein each upstream receiver line card includes a computer or state machine programmed or structured to implement an upstream media access control (UMAC) process, said cable modem termination system including a switch fabric coupled to and serving to route packets between said line cards, a storage/cache circuit, a forwarder/application circuit and ports for coupling to a wide area network and local content servers, said cable modem termination system functioning to serve as the headend of a hybrid fiber coaxial cable system coi-pled via one or more optical nodes to a plurality of cable modems, and wherein said UMAC and DMAC processes, said DOCSIS transmitters and receivers and said switch fabric and said upstream and downstream mapper means cooperate to implement the following functions:
1) creating DOCSIS downstreams and upstreams;
2) implementing a flexible mapping between said downstreams and said optical nodes;
3) mapping one or more downstreams to a shared upstream receiver, and generating and sending suitable downstream DOCSIS messages to implement said mapping;
4) implementing a flexible mapping of optical nodes to upstream receivers;
5) carrying out load balancing so as to create new upstreams and downstreams with channel parameters and burst profiles as needed to meet load balancing considerations;
6) generating and sending suitable switch control commands to said upstream and/or downstream mappers as needed to change said upstream and/or downstream mappings as needed, and generating and sending suitable DOCSIS downstream messages to cause selected cable modems to switch to said new upstreams and/or downstreams as needed to meet said load balancing considerations.

7. The subsystem of claim 6 wherein step 5 further comprises also detecting conditions which may be causing problems in cable modems communicating with said cable modem termination system and creating new upstreams and/or downstreams with channel parameters and burst profiles as needed to resolve problems some cable modems may be having in communicating with said cable modem termination system, and wherein step 6 further comprises generating and sending suitable switch control commands to said upstream and/or downstream mappers as needed to change said upstream and/or downstream mappings as needed to resolve problems some cable modems may be having in communicating with said cable modem termination system, and generating and sending suitable DOCSIS downstream messages to cause selected cable modems to switch to said new upstreams and/or downstreams as needed to resolve problems some cable modems may be having in communicating with said cable modem termination system.

8. A process implemented by a cable modem termination system having a plurality of downstream transmitter line cards and one or more upstream receiver line cards, said downstream transmitter line cards coupled to a plurality of cable modems through a plurality of optical nodes and a downstream mapper, said upstream receiver line cards coupled to a plurality of cable modems through a plurality of optical nodes and an upstream mapper, comprising:
1) creating DOCSIS downstreams and upstreams;
2) implementing a flexible mapping between said downstreams and said optical nodes so as to couple each DOCSIS downstream to one or more selected optical nodes via said downstream mapper;
3) mapping one or more downstreams to a shared upstream receiver and generating and sending suitable downstream DOCSIS messages to implement said mapping;
4) implementing a flexible mapping of optical nodes to upstream receivers via said upstream mapper;
5) conducting DOCSIS ranging with said cable modems and using information in said ranging bursts to build a routing table;
5) carrying out load balance monitoring so as to create new upstreams and/or downstreams with channel parameters and burst profiles as needed to meet load balancing considerations; and
6) generating and sending suitable switch control commands to said upstream and/or downstream mappers as needed to change said upstream and/or downstream mappings between receivers and said optical nodes and between transmitters and said optical nodes as needed to meet said load balancing considerations, and generating and sending suitable DOCSIS downstream messages to cause selected cable modems to switch to said new upstreams and/or downstreams as needed and to alter which downstream share an upstream so to meet said load balancing considerations.

9. The process of claim 8 wherein step 5 further comprises also detecting conditions which may be causing problems in cable modems communicating with said cable modem termination system and creating new upstreams and/or downstreams with channel parameters and burst profiles as needed to resolve problems some cable modems may be having in communicating with said cable modem termination system, and wherein step 6 further comprises generating and sending suitable switch control commands to said upstream and/or downstream mappers as needed to change said upstream and/or downstream mappings as needed to resolve problems some cable modems may be having in communicating with said cable modem termination system, and generating and sending suitable DOCSIS downstream messages to cause selected cable modems to switch to said new upstreams and/or downstreams as needed to to resolve problems some cable modems may be having in communicating with said cable modem termination system.

10. The process of claim 9 wherein said detecting of conditions step is performed during initial ranging of each cable modem.

11. The process of claim 9 wherein said detecting of conditions step is performed during initial ranging of each cable modem and also after each cable modem has registered with said cable modem termination system, and wherein said steps of creating new upstream and/or downstreams and generating suitable switch control commands and generating and sending suitable DOCSIS downstream messages are performed whenever conditions are detected indicating a cable modem may be having problems communicating with said cable modem termination system.

12. A process carried out in a cable modem termination system (CMTS), comprising the steps:
   1) determining the number and type of DOCSIS downstreams needed for cable modems (CMs) present in a hybrid fiber coaxial (HFC) cable system;
   2) in a plurality of downstream line card transmitters that are to share an upstream line card receiver, obtaining synchronized timestamp counts and synchronizing a symbol clock in each downstream line card transmitter that is to share an upstream line card receiver with a master symbol clock of said upstream line card receiver;
   3) mapping each downstream line card transmitters to one or more particular optical nodes in said HFC system and generating suitable switch control signals for a downstream mapper to cause said downstream mapper to couple each said downstream line card transmitter output to the one or more optical nodes to which it has been mapped;
   4) transmitting one of more DOCSIS downstreams of the type and number determined in step I to said optical nodes in accordance with the mapping determined in step 3, and transmitting DOCSIS sync messages containing timestamp samples on each DOCSIS downstream;
   5) determining which said DOCSIS downstreams are to share a DOCSIS upstream and generating in an upstream media access control process (UMAC) channel parameter and burst parameter data which defines said upstream to be shared, and controlling a switch to route said data to one or more downstream media access control (DMAC) processes for said DOCSIS downstreams to share said upstream (hereafter the downstream group);
   6) generating switch control signals to control an upstream mapper to couple selected ones of said optical nodes which receive said downstream group to a radio frequency input of an upstream line card receiver representing said shared upstream;
   7) using said channel parameter and burst parameter data received from said UMAC process for said shared upstream in each of the DMAC processes for downstreams mapped to share said upstream to generate and send on each downstream mapped to said upstream channel descriptor messages describing channel and burst parameters of said shared upstream;
   8) determining the initial ranging contention interval in said UMAC for the shared upstream and transmitting MAP data to said DMAC processes for said downstream group (the DMAC group);
   9) generating in said DMAC group MAP messages and sending said messages on said downstream group;
   10) processing in said UMAC and said upstream receiver line card representing said shared upstream initial ranging bursts from said cable modems tuned to said downstream group, said processing carried out in conventional DOCSIS fashion to make timing, frequency and power offset measurements and develop upstream equalization coefficients for each cable modem;
   11) sending said offset measurements and upstream equalization coefficients for each cable modem to the DMAC process for the downstream to which said cable modem is tuned, and using said data in said DMAC process to send a ranging response message to said cable modem to cause it to adjust its timing, frequency and power and upstream equalization coefficients for subsequent upstream transmissions;
   12) using data in said initial ranging bursts to build a routing table which indicates which cable modems are tuned to each downstream in said downstream group;
   13) determining which cable modems still need to do more ranging, and generating in said UMAC process MAP data defining intervals during which each such cable modem may transmit additional ranging bursts and sending said MAP data to a DMAC process for a downstream to which said cable modem is tuned;
   14) completing DOCSIS ranging using invited ranging bursts and registering each cable modem which has successfully completed ranging;
   15) receiving upstream bandwidth requests from cable modems which have registered;
   16) UMAC of shared upstream processes upstream bandwidth requests so as to grant synchronous code division multiple access (SCDMA) bursts from cable modems coupled to the same optical node so as to be grouped together during the same time interval, and so as to coordinate grants for time division multiple access (TDMA) bursts from cable modems coupled to different optical nodes coupled to said shared upstream receiver line card so that there will be no overlap in time upon arrival of said time division multiple access bursts at said receiver, and generating grant data defining these grants, and sending said grant data to DMAC processes for downstreams to which cable modems having grants are tuned;
   17) generating and sending from said DMAC processes which receive grant data in step 16 MAP messages which inform cable modems having grants when they may transmit and what types of bursts they may transmit;

18) determing from said grant data and said routing table when each granted burst is expected to arrive from each cable modem and generating switch control data to control said upstream mapper so as to couple an upstream signal path from each said optical node which receives a downstream in said downstream group to said radio frequency input of said upstream receiver line card only during a time when a TDMA burst is arriving from an optical node or only during an interval when a plurality of SCDMA bursts are arriving from an optical node so as to avoid noise aggregation;

19) monitoring upstream and downstream traffic loads and deciding whether to add another upstream and/or another upstream receiver to the existing shared upstream and/or another downstream and change said upstream and/or downstream mappings; and 20) if a decision is made to add another upstream with its own identification code, suitable channel and burst parameter data is generated to define the new upstream and send to the DMACs in the downstream group, and the DMACs use this data to generate and send UCD messages which define the new upstream and to send upstream channel change messages to cable modems to be switched to said new upstream;

21) generating new switch control commands for said upstream mapper to change the mapping of optical nodes to upstream receiver line cards to implement said new upstream;

22) if a decision is made in step 19 to add another receiver to the existing upstream, generating suitable switch control signals for said upstream mapper to divert selected bursts to said new upstream receiver line card and sending any configuration data needed by said new receiver line card to configure it to receive the type of bursts to be diverted to it;

23) if a decision is made in step 19 to add another downstream, creating a new downstream and sending DOCSIS channel change messages to cable modems to be switched to said new downstream, and generating suitable switch control signals to said downstream mapper to change mapping between said downstream line card transmitters and said optical nodes; and 24) re-initializing any cable modems switched to new downstreams and/or upstream per conventional DOCSIS processing.

13. The process of claim 12 further comprising the steps of monitoring one or more characteristics of said initial ranging bursts from each cable modem which are indicative of whether said cable modem is having or would be likely to have trouble communicating with said CMTS in future transmissions, and if said characteristics are such as to indicate present or possible future trouble in communicating upstream with said CMTS, creating a new upstream having channel parameters and a burst profile which would be likely to allow each said cable modem which is having trouble communicating upstream to communicate effectively upstream with said CMTS and moving said cable modems which are having problems or which are likely to have future problems communicating with said CMTS to said new upstream.

14. The process of claim 12 further comprising the steps of:

A) determining which cable modems (CM5) are having problems or would be likely to have problems in the future with reliable upstream communication with said CMTS by monitoring a communication parameter of initial ranging bursts from each cable modem;

B) generating data that defines a lower throughput upstream channel and sending said data to the DMACs for downstreams to which are tuned CMs located in step A;

C) using said data generated in step B in said DMAC processes for downstreams to which CMs located in step A are tuned to generate new UCD messages which define channel and burst parameters of a new lower throughput upstream, and sending said UCD messages downstream;

D) generating channel change messages in said UMAC of an upstream shared by said downstream group, and sending said channel change messages to said DMACs coupled to the downstreams to which the CMs located in step A are tuned;

E) sending said channel change messages to the CMs located in step A to order said CMs to reconfigure their upstream transmitters to transmit on the upstream created in step C;

F) send switching commands to cause said upstream mapper to change connections to couple optical nodes coupled to said CMs located in step A to a new upstream receiver (receiver #2) , and send channel parameter and burst profile data for said new lower throughput upstream channel to receiver #2 to configure said receiver to properly to receive bursts on said new lower throughput channel;

G) when bursts from CMs not having problems communicating upstream but which are coupled to the same optical nodes as the CMs located in step A are scheduled to arrive at said CMTS, sending channel parameter and the burst profile data for the original shared upstream to said receiver #2 to configure said receiver to properly to receive said bursts from said original shared upstream or controlling said upstream mapper to redirect said bursts from said CMs not having problems to the radio frequency input of said shared upstream receiver to which all initial ranging bursts were directed;

H) doing conventional DOCSIS processing to get said CMs which have been moved to said new lower throughput upstream channel synchronized with said CMTS on the new upstreams to which they have been moved.

15. The process of claim 12 wherein step 19 further comprises the steps of monitoring one or more characteristics of post registration bursts from each cable modem which are indicative of whether said cable modem is having or would be likely to have trouble communicating with said CMTS in future transmissions, and if said characteristics are such as to indicate present or possible future trouble in communicating upstream with said CMTS, creating a new upstream having channel parameters and a burst profile which would be likely to allow each said cable modem which is having trouble communicating upstream to communicate effectively upstream with said CMTS and moving said cable modems which are having problems or which are likely to have future problems communicating with said CMTS to said new upstream.

16. A process carried out in a cable modem termination system (CMTS) comprising the steps:

1) creating DOCSIS downstreams suitable for cable modems coupled to said cable modem termination system via one or more optical nodes of a hybrid fiber coaxial cable system, and creating at least one DOCSIS upstream;

2) implementing a flexible mapping between said downstreams and said optical nodes so as to couple each DOCSIS downstream to one or more of said optical nodes via a downstream mapper;
3) mapping one or more downstreams to a shared upstream receiver in said CMTS, and generating and sending suitable downstream DOCSIS messages to implement said mapping;
4) implementing a flexible mapping of optical nodes to upstream receivers in said CMTS via said upstream mapper;
5) conducting DOCSIS ranging and registration with said cable modems and using information in said ranging and/or registration processes to build a routing table;
6) conducting conventional DOCSIS processing to receive upstream bandwidth requests and send MAP data containing grants of upstream bandwidth to cable modems;
7) carrying out load balance monitoring so as to determine the need to add new upstream receivers to share the traffic load on said shared upstream or to create new upstreams and/or downstreams with channel parameters and burst profiles as needed to meet load balancing considerations; and
8) generating and sending suitable switch control commands to said upstream as needed to change said upstream mapping of optical nodes to receiver inputs and/or change said downstream mapping of transmitters to optical nodes, and generating and sending DOCSIS messages to move cable modems to new upstreams and/or downstreams as needed to meet said load balancing considerations, and generating and sending suitable DOCSIS downstream messages to change mappings of downstreams to a shared upstream as needed to meet said load balancing considerations.

17. The process of claim 16 further comprising the steps of monitoring signal-to-noise-ratio and/or received power during said DOCSIS ranging and, for any cable modem which is not able to successfully complete ranging because of a bad signal-to-noise-ratio and/or inadequate received power, creating a new upstream having channel parameters and a burst profile which is established to allow said cable modem to successfully complete ranging and register as a cable modem with said CMTS, and sending DOCSIS messages to said cable modem to move it to said new upstream and conduct conventional DOCSIS reinitialization if necessary.

* * * * *